(12) United States Patent
Xiong et al.

(10) Patent No.: US 12,719,619 B2
(45) Date of Patent: Aug. 25, 2026

(54) TIME DOMAIN BUNDLING OF HYBRID AUTOMATIC REPEAT REQUEST-ACKNOWLEDGEMENT (HARQ-ACK) FEEDBACK

(71) Applicant: Intel Corporation, Santa Clara, CA (US)

(72) Inventors: Gang Xiong, Portland, OR (US); Yingyang Li, Beijing (CN); Daewon Lee, Portland, OR (US); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 342 days.

(21) Appl. No.: 18/550,274

(22) PCT Filed: Jun. 15, 2022

(86) PCT No.: PCT/US2022/033648

§ 371 (c)(1),
(2) Date: Sep. 12, 2023

(87) PCT Pub. No.: WO2022/271510

PCT Pub. Date: Dec. 29, 2022

(65) Prior Publication Data

US 2024/0178945 A1 May 30, 2024

Related U.S. Application Data

(60) Provisional application No. 63/218,859, filed on Jul. 6, 2021, provisional application No. 63/215,836, filed on Jun. 28, 2021, provisional application No. 63/213,481, filed on Jun. 22, 2021, provisional application No. 63/213,081, filed on Jun. 21, 2021.

(51) Int. Cl.
*H04L 1/1829* (2023.01)

(52) U.S. Cl.
CPC .......... *H04L 1/1854* (2013.01); *H04L 1/1864* (2013.01)

(58) Field of Classification Search
CPC ... H04L 1/1854; H04L 1/1864; H04L 1/1671; H04L 1/1812; H04L 1/1621; H04W 72/232
See application file for complete search history.

(56) References Cited

U.S. PATENT DOCUMENTS

2020/0169357 A1* 5/2020 Lei ........................ H04L 1/0025
2024/0243855 A1* 7/2024 Bhamri ................ H04L 1/1861

OTHER PUBLICATIONS

International Patent Office—International Search Report and Written Opinion mailed Oct. 11, 2022, from International Patent Application No. PCT/US2022/033648, 10 pages.
Lenovo et al., "PDSCH/PUSCH scheduling enhancements for NR from 52.6 GHz to 71GHz," 3GPP TSG RAN WG1 #105-e, R1-2105497, Agenda Item: 8.2.5, May 10-27, 2021, e-meeting, 8 pages.
Samsung, "PDSCH/PUSCH enhancements for NR from 52.6 GHz to 71 GHz," 3GPP TSG RAN WG1 #105-e, R1-2105299, Agenda item: 8.2.5, May 10-27, 2021, e-Meeting, 13 pages.

(Continued)

*Primary Examiner* — Yaotang Wang
(74) *Attorney, Agent, or Firm* — Gray Ice Higdon, PLLC

(57) ABSTRACT

Various embodiments herein are directed to time domain bundling of hybrid automatic repeat request-acknowledgement (HARQ-ACK) feedback. Other embodiments may be disclosed or claimed.

20 Claims, 22 Drawing Sheets

(56) References Cited

OTHER PUBLICATIONS

Intel Corporation, “Discussion on PDSCH/PUSCH enhancements for extending NR up to 71 GHz,” 3GPP TSG RAN WG1 #105-e, R1-2104896, Agenda item: 8.2.5, May 19-27, 2021, e-Meeting, 9 pages.

Ericssion, “PDSCH/PUSCH enhancements,” 3GPP TSG-RAN WG1 Meeting #105-e, Tdoc R1-2104462, Agenda Item: 8.2.5, May 10-27, 2021, e-Meeting, 26 pages.

* cited by examiner

| Header E.g. 0 1 0 0 1 | HARQ-ACK for the 2nd DCI | HARQ-ACK for the 5th DCI | Padding |
|---|---|---|---|

Figure 1 header

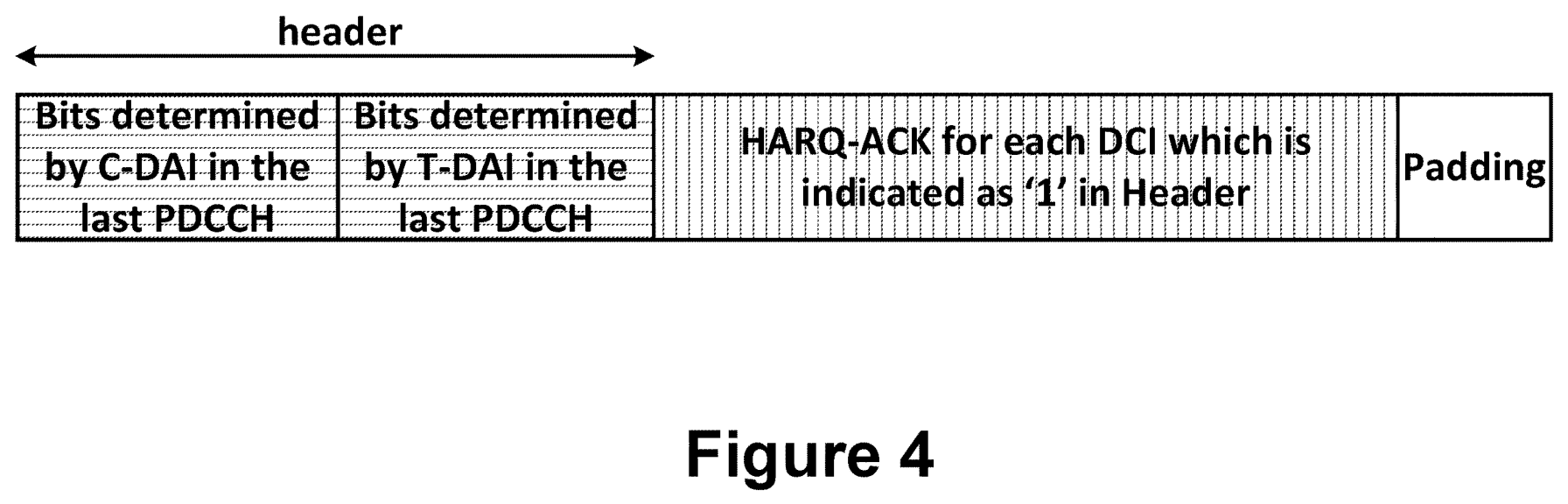

Bits determined by C-DAI in the last PDCCH

Bits determined by T-DAI in the last PDCCH

HARQ-ACK for each DCI which is indicated as '1' in Header

Padding

Figure 4

| | | | | | | | | |
|---|---|---|---|---|---|---|---|---|
| | | | | | | | last PDCCH | |
| C-DAI: | X-N+2 | X-N+3 | ... | X-3 | X-2 | X-1 | X | X+1 |
| | N*(N+1)/2 SLIVs for any 1~N consecutive C-DAIs | | | | | | | |

Figure 10

| | | | | | | | | last PDCCH | |
|---|---|---|---|---|---|---|---|---|---|
| C-DAI: | X-N+1 | X-N+2 | X-N+3 | ... | X-3 | X-2 | X-1 | X | X+1 |
| | N*(N+1)/2 SLIVs for any 1~N consecutive C-DAIs | | | | | | | | |
| | | N SLIVs with ending CDAI X+1 | | | | | | | |

Figure 11

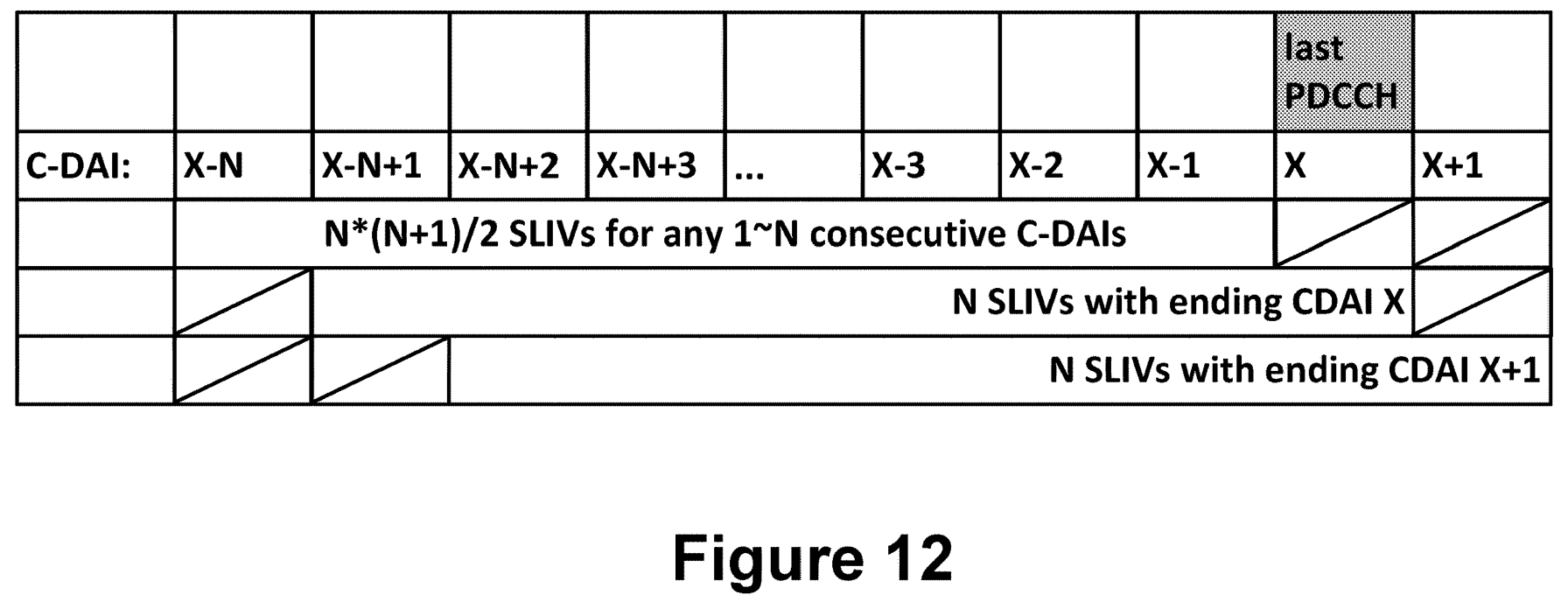

| | | | | | | | | | last PDCCH | |
|---|---|---|---|---|---|---|---|---|---|---|
| C-DAI: | X-N | X-N+1 | X-N+2 | X-N+3 | ... | X-3 | X-2 | X-1 | X | X+1 |
| | N*(N+1)/2 SLIVs for any 1~N consecutive C-DAIs | | | | | | | | | |
| | | N SLIVs with ending CDAI X | | | | | | | | |
| | | | N SLIVs with ending CDAI X+1 | | | | | | | |

Figure 12

| | | | | | | | last PDCCH | |
|---|---|---|---|---|---|---|---|---|
| C-DAI: | X-N+2 | X-N+3 | ... | X-3 | X-2 | X-1 | X | X+1 |

N-3 SLIVs with ending CDAI X-2

N-2 SLIVs with ending CDAI X-1

N-1 SLIVs with ending CDAI X

N SLIVs with ending CDAI X+1

Figure 13

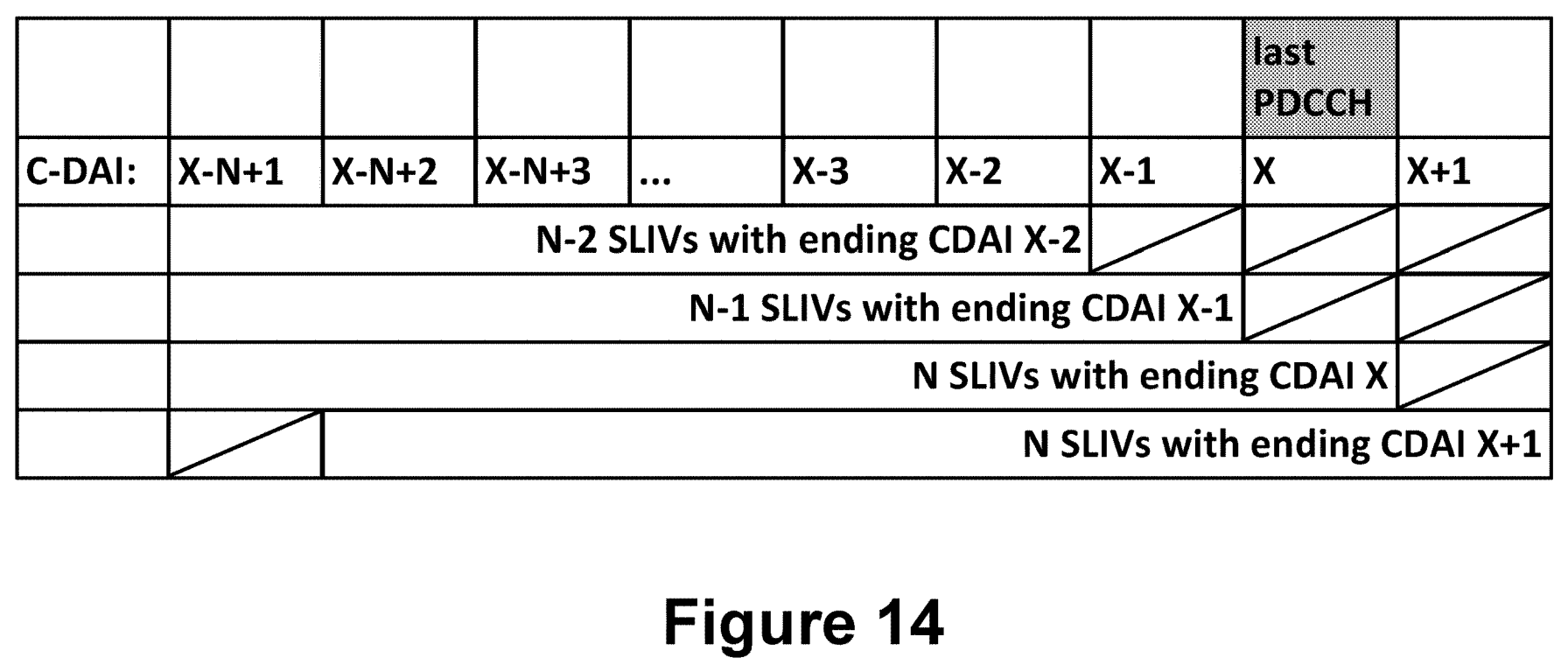

| | | | | | | | | | |
|---|---|---|---|---|---|---|---|---|---|
| | | | | | | | | last PDCCH | |
| C-DAI: | X-N+1 | X-N+2 | X-N+3 | ... | X-3 | X-2 | X-1 | X | X+1 |
| | N-2 SLIVs with ending CDAI X-2 | | | | | | | | |
| | N-1 SLIVs with ending CDAI X-1 | | | | | | | | |
| | N SLIVs with ending CDAI X | | | | | | | | |
| | | N SLIVs with ending CDAI X+1 | | | | | | | |

Figure 14

| | | | | | | | | | | |
|---|---|---|---|---|---|---|---|---|---|---|
| | | | | | | | | | last PDCCH | |
| C-DAI: | X-N | X-N+1 | X-N+2 | ... | X-4 | X-3 | X-2 | X-1 | X | X+1 |
| | N-1 SLIVs with ending CDAI X-2 | | | | | | | | | |
| | N SLIVs with ending CDAI X-1 | | | | | | | | | |
| | | N SLIVs with ending CDAI X | | | | | | | | |
| | | | N SLIVs with ending CDAI X+1 | | | | | | | |

Figure 15

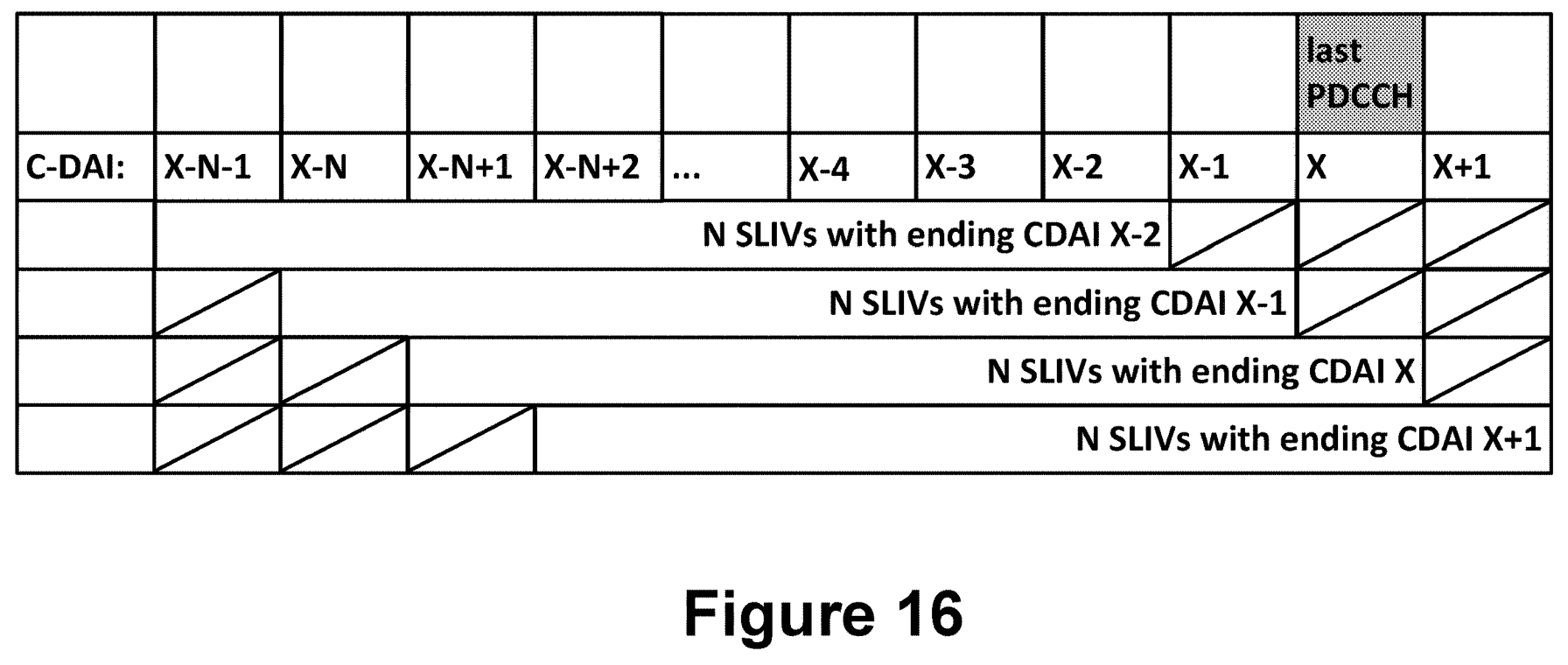

| | | | | | | | | | | | |
|---|---|---|---|---|---|---|---|---|---|---|---|
| | | | | | | | | | | last PDCCH | |
| C-DAI: | X-N-1 | X-N | X-N+1 | X-N+2 | ... | X-4 | X-3 | X-2 | X-1 | X | X+1 |

N SLIVs with ending CDAI X-2

N SLIVs with ending CDAI X-1

N SLIVs with ending CDAI X

N SLIVs with ending CDAI X+1

Figure 16

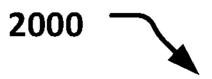

Retrieving, from a memory, downlink control information (DCI) associated with a scheduled downlink (DL) transmission to be received by a user equipment (UE)
2005

Determining, based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission
2010

Encoding a message for transmission to a next-generation NodeB (gNB) that includes the HARQ-ACK feedback information
2015

Figure 20

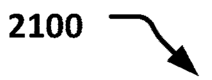

Receiving, by a user equipment (UE) from a next-generation NodeB (gNB), downlink control information (DCI) associated with a scheduled downlink (DL) transmission to be received by the UE
2105

Determining, by the UE based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission
2110

Encoding, by the UE, a message for transmission to a next-generation NodeB (gNB) that includes the HARQ-ACK feedback information
2115

Figure 21

Receiving, by a user equipment (UE) from a next-generation NodeB (gNB), downlink control information (DCI) associated with a scheduled downlink (DL) transmission to be received by the UE
2205

Determining, by the UE based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission, wherein the time domain bundling size is based on an uplink control information (UCI) payload size and the HARQ-ACK codebook size
2210

Encoding, by the UE, a message for transmission to a next-generation NodeB (gNB) that includes the HARQ-ACK feedback information
2215

Figure 22

TIME DOMAIN BUNDLING OF HYBRID AUTOMATIC REPEAT REQUEST-ACKNOWLEDGEMENT (HARQ-ACK) FEEDBACK

CROSS REFERENCE TO RELATED APPLICATIONS

The present application is a national phase entry under 35 U.S.C. § 371 of International Application No. PCT/US2022/033648, filed Jun. 15, 2022, entitled "TIME DOMAIN BUNDLING OF HYBRID AUTOMATIC REPEAT REQUEST-ACKNOWLEDGEMENT (HARQ-ACK) FEEDBACK," which claims priority to: U.S. Provisional Patent Application No. 63/213,081, which was filed Jun. 21, 2021; U.S. Provisional Patent Application No. 63/213,481, which was filed Jun. 22, 2021; U.S. Provisional Patent Application No. 63/215,836, which was filed Jun. 28, 2021; and to U.S. Provisional Patent Application No. 63/218,859, which was filed Jul. 6, 2021, the entire disclosures of which are hereby incorporated by reference.

FIELD

Various embodiments generally may relate to the field of wireless communications. For example, some embodiments may relate to time domain bundling of hybrid automatic repeat request-acknowledgement (HARQ-ACK) feedback.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich content and services.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 illustrates an example of HARQ-ACK codebook generation in accordance with various embodiments.

FIG. 4 illustrates an example of header size determined by C-DAI/T-DAI in the last PDCCH in accordance with various embodiments.

FIGS. 10 through 16 illustrate examples of SLIV based indication of range of C-DAI in accordance with various embodiments.

FIGS. 20, 21, and 22 depict examples of procedures for practicing the various embodiments discussed herein.

DETAILED DESCRIPTION

Figure 2:
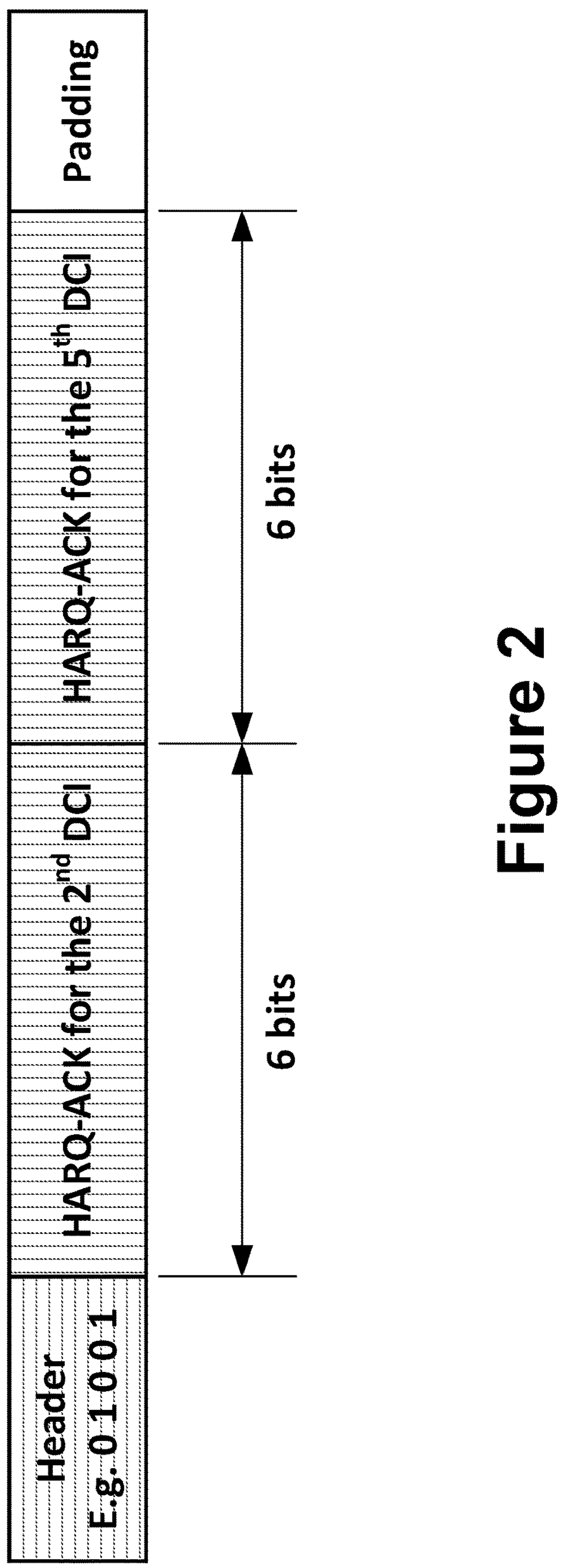
FIG. 2 illustrates an example of Time domain bundling of HARQ-ACK feedback per DCI in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

The NR system operates based on the concept of slot. For example, a physical downlink shared channel (PDSCH) or a physical uplink shared channel (PUSCH) may be restricted within a slot. Such restrictions on PDSCH or PUSCH may still apply in higher frequencies. On the other hand, for a system operating above a 52.6 GHz carrier frequency, especially for Terahertz communication, it is envisioned that a larger subcarrier spacing is needed to combat severe phase noise. In cases when a larger subcarrier spacing, e.g., 1.92 MHz or 3.84 MHz is employed, the slot duration can be relatively short. For instance, for a 1.92 MHz subcarrier spacing, one slot duration is approximately 7.8 μs. This extremely short slot duration may not be sufficient for higher layer processing, including Medium Access Layer (MAC) and Radio Link Control (RLC), etc. In order to address this issue, a next-generation NodeB (gNB) may schedule a downlink (DL) or uplink (UL) data transmission across a slot boundary with a long transmission duration. In other words, the traditional slot concept may not be needed when scheduling data transmissions in some cases.

In a DL transmission, more DL traffic may arrive at the gNB when the gNB has already sent out downlink control information (DCI) for a DL transmission, or a previous PDSCH transmission is still ongoing. The gNB may have to send a new DL DCI to schedule a PDSCH which results in the delay of data transmissions. One solution could be to allow a gNB to schedule more DL resources than that required to transmit the current DL data in the buffer. Consequently, if new DL traffic arrives, the gNB can continue the PDSCH transmission for the new DL traffic on the scheduled DL resource. On the other hand, if there is no new incoming DL traffic, the scheduled DL resources need to be released earlier, e.g., early termination of the PDSCH transmission. In fact, besides the case of lacking new DL traffic, there may also exist other reasons that the gNB needs to terminate a DL transmission earlier.

For a DL or UL transmission in NR, a transport block (TB) from the MAC layer is transmitted at physical layer. For the hybrid automatic repeat request (HARQ) transmission of DL transmission, a single HARQ-ACK bit could be reported by a user equipment (UE) for a TB. Alternatively, if code block group (CBG) based transmission is configured, e.g. a TB is divided into n CBGs, n≤N, N=1, 2, 4, 8, a CBG consists of one or multiple code block (CB)s. A CBG transmission indicator (CBGTI) field is used to indicate whether a CBG is scheduled or not by a DCI. A UE could report n or N HARQ-ACK bits for the TB. One HARQ-ACK bit is reported for each CBG. N is the maximum number of CBGs which could be configured by high layer. If a DCI schedules X TBs, there are X NDI bits in the DCI. For a system operating above 52.6 GHz carrier frequency, to support a long PDSCH transmission with or without early termination, an efficient HARQ-ACK transmission scheme should be designed.

Note that time domain bundling of HARQ-ACK feedback may be employed to further reduce HARQ-ACK codebook size. In cases when the uplink coverage may be an issue, the indicated uplink control information (UCI) payload size may be small, so that a larger bundle size for HARQ-ACK bundling may be applied. On the other hand, when a UE is in a good coverage condition, the indicated UCI payload size can be relatively large so that a smaller bundle size for HARQ-ACK bundling may be employed. In an extreme case, no HARQ-ACK bundling is applied so that the UE would report all the HARQ-ACK feedback on a group of CBBs.

In cases when time domain bundling of HARQ-ACK feedback is employed, and when HARQ-ACK feedback for PDSCH scheduled by fallback downlink control information (DCI) and non-fallback DCI are included in a single UCI report, it may not be desirable to perform time domain bundling for HARQ-ACK feedback for PDSCH scheduled by fallback DCI. In this case, certain enhancement may need to be considered for time domain bundling of HARQ-ACK feedback.

Various embodiments herein provide mechanisms for time domain bundling of HARQ-ACK feedback for higher carrier frequency. For example, some embodiments may include:

- Enhancements for time domain bundling of HARQ-ACK feedback; and
- Dynamic triggering of joint and separate HARQ-ACK feedback for multi-TRP operation.

Some embodiments disclosed herein include detailed designs for HARQ-ACK transmission for support a long PDSCH transmission with or without early termination above a 52.6 GHz carrier frequency.

In the following descriptions, a downlink or uplink data transmission scheduled by a DCI may include M code block bundle (CBB)s, where M can be varied depending on the allocated time resource and/or frequency resource. Each CBB may include one or multiple consecutive code block (CB)s. A cyclic redundancy check (CRC) is added for each CB. A CBB could be exclusively mapped to one or more consecutive data symbols. In this manner, symbol alignment is achieved for a CBB. One HARQ-ACK bit could be generated per CBB corresponding to a MAC PDU or a TB. A separate HARQ process number may be assigned to each CBB.

Since the duration of the DL time resource that is allocated by a DCI can be flexible, the number of CBBs scheduled by the DCI may vary accordingly. Consequently, the exact number of HARQ-ACK bits for the DL data transmission is not fixed. If a fixed number of HARQ-ACK bits were associated with a DCI, the number must be determined based on the maximum duration of the schedulable DL time resource, which results in large overhead in HARQ-ACK codebook. Therefore, it is preferred for the UE to report the exact number of HARQ-ACK bits for the DL data transmission scheduled by a DCI.

The HARQ-ACK codebook that is transmitted in a UL resource could include the HARQ-ACK bits for the DL data transmissions that are scheduled by one or more DCIs. The UE could report a discontinuous transmission (DTX) indication for each DCI in a header of the HARQ-ACK codebook. The header may be in the form of a bitmap. Therefore, each bit in the header may indicate whether a corresponding DCI is detected or not. If DTX is not indicated for a DCI in the header, e.g. the DCI is received, the UE can report the exact number of HARQ-ACK bits for the DL data transmission that is scheduled by the DCI. On the other hand, if DTX is indicated for a DCI in the header, e.g. the DCI is not received, no HARQ-ACK bit is included in the codebook for the DCI.

The codebook size of HARQ-ACK codebook may be indicated by the last DCI that indicate the UL resource. For example, Y bits in the last DCI can indicate 2 different codebook sizes. If the total number of header bits and HARQ-ACK bits is less than the indicated codebook size, padding bits are added to indicated codebook size. If the total number of header bits and HARQ-ACK bits exceeds the indicated codebook size, certain bundling can be applied to reduce the number of HARQ-ACK bits. For example, instead of reporting one HARQ-ACK bit per CBB, UE report one HARQ-ACK bits per CBB bundle.

Figure 1:
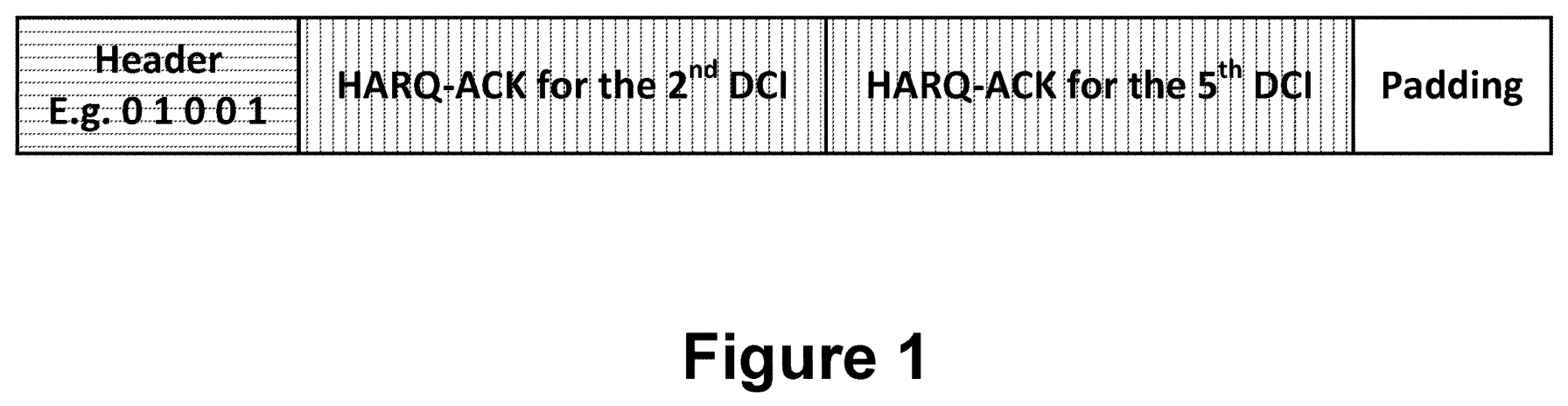

FIG. 1 illustrates an example for the HARQ-ACK codebook generation with DTX indication for the DCIs. In this example, it is assumed that maximum 5 DCIs may be received by a UE that schedule DL data transmissions. The UE only detects the second and fifth DCI. Consequently, the UE indicates a header bitmap of '0 1 0 0 1'. Then, the UE includes the HARQ-ACK bits for the DL data transmissions scheduled by the second and fifth DCI.

Note that time domain bundling of HARQ-ACK feedback may be employed to further reduce HARQ-ACK codebook size. In case when the uplink coverage may be an issue, the indicated UCI payload size may be small, so that a larger bundle size for HARQ-ACK bundling may be applied. On the other hand, when UE is in a good coverage condition, the indicated UCI payload size can be relatively large so that a smaller bundle size for HARQ-ACK bundling may be employed. In an extreme case, no HARQ-ACK bundling is applied so that UE would report all the HARQ-ACK feedback on a group of CBBs.

Enhancement for Time Domain Bundling of HARQ-ACK Feedback

Embodiments of enhancement on time domain bundling of HARQ-ACK feedback are provided below.

In one embodiment, the time domain bundling of HARQ-ACK feedback is performed per DCI. When semi-static time domain bundling of HARQ-ACK feedback is applied, the HARQ-ACK codebook size for each DCI is determined based on the configured bundle size and the number of CBB groups for each PDSCH.

When dynamic time domain bundling of HARQ-ACK feedback is applied, the HARQ-ACK codebook size for each DCI is determined based on the determined bundle size and the number of CBB groups for each PDSCH. Note that the determined bundle size is calculated based on the indicated UCI payload size and the actual HARQ-ACK codebook size.

FIG. 2 illustrates one example of time domain bundling of HARQ-ACK feedback per DCI. In FIG. 2, it is assumed 22 bits HARQ-ACK feedback are generated for each DCI. Further, the bundle size of HARQ-ACK feedback is 4. In this case, the number of HARQ-ACK feedback bits for each DCI is 6 as shown.

In another embodiment, when HARQ-ACK feedback for PDSCH scheduled by fallback DCI and non-fallback DCI are included in a single UCI report, and when time domain bundling for HARQ-ACK feedback is applied, no time bundling is applied for the HARQ-ACK feedback for PDSCH scheduled by fallback DCI. In this case, time domain bundling is only applied for the HARQ-ACK feedback for PDSCH scheduled by the same non-fallback DCI. Alternatively, time domain bundling can be applied for the HARQ-ACK feedback for PDSCHs scheduled by the same or different non-fallback DCIs. Note that this may be for the case when fallback DCI is used to schedule a PDSCH with a single transport block or CBB.

In another option, separate time domain bundling sizes are applied for the HARQ-ACK feedback for PDSCH scheduled by fallback DCI and non-fallback DCI, respectively. In particular, the bundle size for HARQ-ACK feedback for PDSCH scheduled by fallback DCI and non-fallback DCI can be configured by higher layers via minimum system information (MSI), remaining minimum system information (RMSI), other system information (OSI) or dedicated radio resource control (RRC) signalling or dynamically indicated in the downlink control information (DCI) or a combination thereof.

Figure 3:
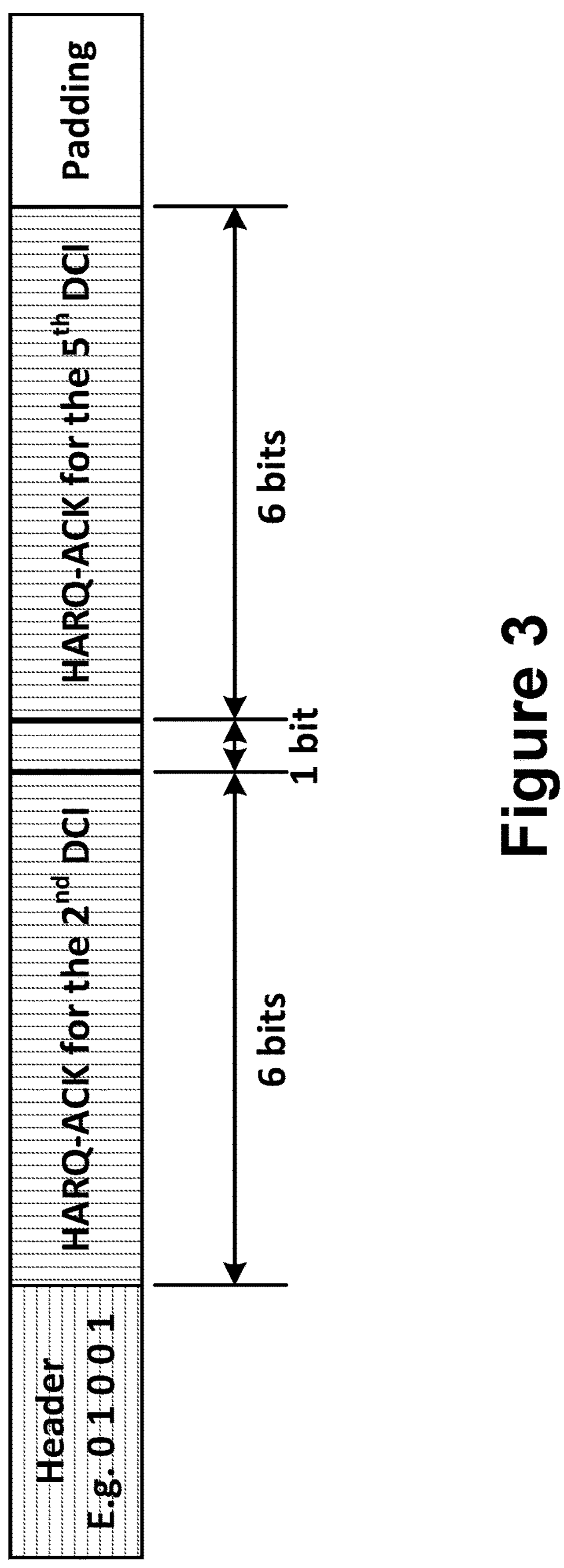
FIG. 3 illustrates an example of separate time domain bundling of HARQ-ACK feedback for fallback and non-fallback DCI in accordance with various embodiments.

FIG. 3 illustrates one example of separate time domain bundling of HARQ-ACK feedback for fallback and non-fallback DCI. In the example, 22 bits HARQ-ACK feedback are generated for each non-fallback DCI and the determined bundle size is 4. In this case, the number of HARQ-ACK feedback bits for each non-fallback DCI is 6 while the number of HARQ-ACK feedback bits for fallback DCI is 1, which indicates that no time domain bundling is applied for HARQ-ACK feedback for fallback DCI.

Dynamic Triggering of Joint and Separate HARQ-ACK Feedback for Multi-TRP Operation In multi-TRP operation, a gNB may transmit PDSCHs from two or more TRPs to the UE. Correspondingly, UE needs to report HARQ-ACKs of the PDSCHs that are transmitted by the two TRPs. The HARQ-ACKs could be separately transmitted for each TRP in different HARQ-ACK codebooks. Alternatively, the HARQ-ACKs could be jointly transmitted in the same HARQ-ACK codebook.

Embodiments of mechanisms on dynamic triggering of joint or separate HARQ-ACK feedback for multi-TRP operation are provided as follows:

In one embodiment, the counter downlink assignment index (C-DAI) in a PDCCH counts the number of PDCCHs that schedule PDSCH transmissions on the same TRP till the PDCCH. The PDCCH can include an indication on the TRP(s) for the PDSCH transmissions for which the HARQ-ACK feedback are triggered. The indication on the TRP(s) can include {TRP 0 only, TRP 1 only, both TRPs, none} or its subset. Specifically, it can indicate one from {scheduled TRP only, both TRPs, none} or {scheduled TRP only, both TRPs}. If HARQ-ACK transmission is only triggered for one TRP, the PDCCHs/PDSCHs of the TRP are ordered by the C-DAI of the PDCCHs for the TRP. On the other hand, if HARQ-ACK transmission is triggered for both two TRPs, the PDCCHs/PDSCHs of the two TRPs are ordered by the C-DAI of the PDCCHs and a total DAI (T-DAI) of the last PDCCH. The C-DAI for a TRP can be reset to value 1 when a new HARQ-ACK codebook is to be generated. Correspondingly, the HARQ-ACK codebook includes HARQ-ACK bits for PDSCH transmission scheduled by PDCCH with C-DAI starting with value 1 for each TRP.

In one option, the PDCCH that schedules PDSCH transmission on a TRP can include a T-DAI field. If HARQ-ACK transmission is triggered for one TRP, the T-DAI indicates the total number of PDCCHs that schedules PDSCH transmission on the TRP till the timing of PDCCH. Otherwise, If HARQ-ACK transmission is triggered for both two TRPs, the T-DAI indicates the total number of PDCCHs that schedule PDSCH transmissions on the other TRP till the timing of PDCCH. With this scheme, the total number of PDCCHs that schedules transmissions on a TRP can be derived by C-DAI in the last PDCCH that schedules PDSCH transmission on the TRP. Meanwhile, the total number of PDCCHs that schedule PDSCH transmissions on the other TRP can be derived by T-DAI in the last PDCCH. Therefore, the total number of PDCCHs that schedule PDSCH transmissions can be obtained accordingly, which determines the size of header field in HARQ-ACK codebook.

FIG. 4 illustrates one example where the header is generated by a number of bits for the TRP that is determined by the C-DAI in the last PDCCH followed by a number of bits for the other TRP that is determined by the T-DAI in the last PDCCH. Alternatively, the header may always include the bits for TRP 0 in the beginning followed by the bits for TRP 1.

In another option, the PDCCH that schedules PDSCH transmission on a TRP can include a T-DAI field. If HARQ-ACK transmission is triggered for one TRP, the T-DAI indicates the total number of PDCCHs that schedules PDSCH transmission on the TRP till the timing of PDCCH. Alternatively, the T-DAI indicates the total number of PDCCHs that schedule PDSCH transmissions on the TRP with potential prediction on PDCCHs after the timing of the PDCCH. Otherwise, If HARQ-ACK transmission is triggered for both two TRPs, the T-DAI indicates the total number of PDCCHs that schedule PDSCH transmissions on the two TRPs till the timing of PDCCH. Alternatively, the T-DAI indicates the total number of PDCCHs that schedule PDSCH transmissions on the two TRPs with potential prediction on PDCCHs after the timing of the PDCCH. The total number of PDCCHs that schedule PDSCH transmissions, e.g. size of header is determined by the T-DAI in the last PDCCH. Since UE may not exactly knows the total number of PDCCHs for each TRP, the PDCCHs for one TRP could be mapped from the beginning of the header, while the PDCCHs of the other TRP could be mapped from the end of the header.

Figure 5:
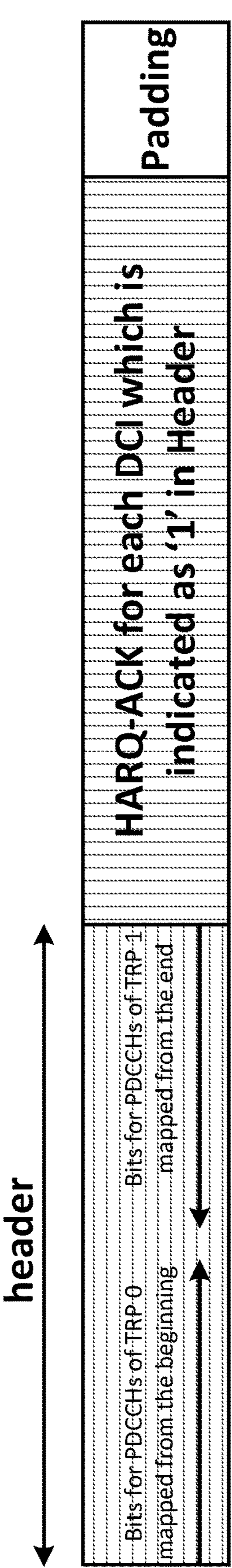
FIG. 5 illustrates an example of header size determined by T-DAI in the last PDCCH in accordance with various embodiments.

FIG. 5 illustrates one example that the header includes the bits for PDCCHs of TRP 0 from the beginning and the bits for PDCCHs of TRP 1 from the end. The PDCCHs for each TRP are ordered by the C-DAI of the PDCCHs. Alternatively, the header may always include the bits for the TRP used by the PDSCH transmission scheduled by the last PDCCH from the beginning while the bits for the other TRP from the end.

In the above embodiment, the handling C-DAI may be replaced by following behavior. The C-DAI for a TRP doesn't reset, e.g. C-DAI of the TRP is always incremented by 1 when a new PDCCH is transmitted on the TRP, irrespectively of new HARQ-ACK codebook is to be generated or not. The UE can be indicated for each TRP a range of C-DAIs of the PDCCHs for which the HARQ-ACK bits are included in the HARQ-ACK codebook. The range for a TRP could be indicated by a starting C-DAI and an ending C-DAI. Or, the range for a TRP could be indicated by a starting C-DAI and a number of C-DAI values. Or, assuming the C-DAI in the last received PDCCH is the ending C-DAI for a TRP, the range for the TRP can be defined by a starting C-DAI or by a number of C-DAI values. Or, assuming the ending C-DAI of a TRP equals to or can be derived by the C-DAI in the last received PDCCH, the range for the TRP can be defined by a starting C-DAI or by a number of C-DAI values. Or, the last PDCCH can indicate a total number of C-DAIs of the two TRPs, which determines the size of header of HARQ-ACK codebook, and the starting C-DAIs of each TRP. The PDCCHs for one TRP could be mapped from the beginning of the header, while the PDCCHs of the other TRP could be mapped from the end of the header.

Alternatively, the starting C-DAI and number of C-DAI values are counted in a backward manner. In particular, last received PDCCH is the starting C-DAI with index 0.

Note that for the above embodiments, the starting and length indicator value (SLIV) for C-DAI can be included in the scheduling DCI, which can be used to indicate the starting C-DAI and number of C-DAI for HARQ-ACK feedback. The maximum number of C-DAI used for HARQ-ACK feedback can be predefined in the specification or configured by higher layers via minimum system information (MSI), remaining minimum system information (RMSI), other system information (OSI) or dedicated radio resource control (RRC) signalling or dynamically indicated in the downlink control information (DCI) or a combination thereof.

In one embodiment, the C-DAI in a PDCCH counts the number of PDCCHs that schedule PDSCH transmissions on the two TRPs till the PDCCH, e.g. joint C-DAI across two TRPs. Correspondingly, the PDCCHs/PDSCHs of the two TRPs are ordered by the C-DAI of the PDCCHs. The PDCCH can include an indication on the TRP(s) for the PDSCH transmissions for which the HARQ-ACK feedback are triggered. The indication on the TRP(s) can include {TRP 0 only, TRP 1 only, both TRPs, none} or its subset. Specifically, it can indicate one from {scheduled TRP only, both TRPs, none} or {scheduled TRP only, both TRPs}. The C-DAI can be reset to value 1 when a new HARQ-ACK codebook is to be generated. Correspondingly, the HARQ-ACK codebook includes HARQ-ACK bits for PDSCH transmissions scheduled by the PDCCHs with C-DAI starting with value 1, if the PDSCH transmissions are on the triggered TRP(s).

In one option, the PDCCH can include a T-DAI which indicates the total number of PDCCHs that schedule PDSCH transmissions on the two TRPs till the timing of PDCCH. Alternatively, the T-DAI indicates the total number of PDCCHs that schedule PDSCH transmissions on the two TRPs with potential prediction on PDCCHs after the timing of the PDCCH. The size of header in HARQ codebook is determined by the T-DAI in the last PDCCH, irrespectively of the number of TRPs for the PDSCH transmissions for which the HARQ-ACK feedback are triggered. If HARQ-ACK for both two TRPs are triggered, the header bits corresponding to the C-DAI of the detected PDCCHs of the two TRPs can be set to '1'. All other header bits are set to '0'. If HARQ-ACK for only one TRP is triggered, the header bits corresponding to the C-DAI of the detected PDCCHs of the TRP can be set to '1'. Further, all other bits, including the bits corresponding to the C-DAI of the PDCCHs of the other TRP, can be set to '0'. UE only includes HARQ-ACK bits for the PDSCH transmissions corresponding to the PDCCHs with value '1' in the header.

Figure 6:
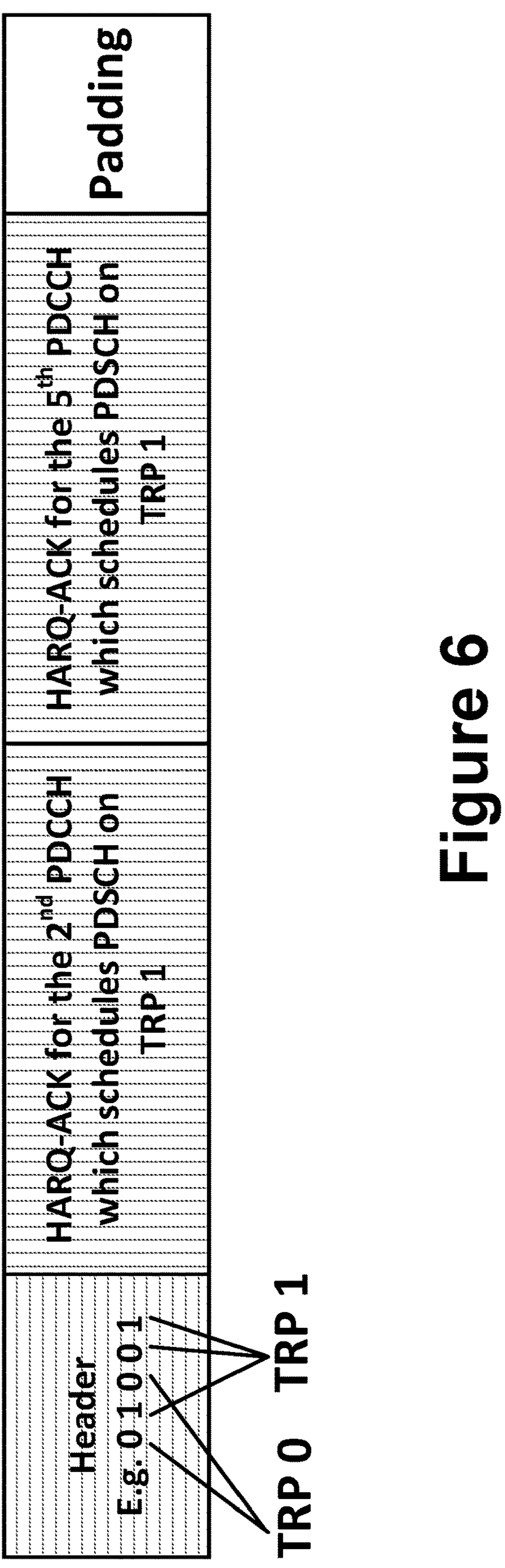
FIG. 6 illustrates an example of header size determined by PDCCHs of two TRPs with triggered HARQ-ACK for one TRP in accordance with various embodiments.

FIG. 6 illustrates one example of joint C-DAI across two TRPs and triggered HARQ-ACK feedback for only one TRP. In the example, it is assumed that gNB schedules 5 PDSCHs on the two TRPs by 5 PDCCHs with C-DAI with value 1, 2, 3, 4 and 5. The PDCCH with C-DAI value 2, 4 and 5 are for PDSCH transmissions on TRP 1 and the other PDCCHs are for TRP 0. It is assumed that gNB triggers HARQ-ACK feedback for PDSCH transmissions on TRP 1. It is further assumed that UE miss the PDCCH with C-DAI value 4. The UE will generate a header of size 5 bits. The second and fifth bits are set to value '1' corresponding to PDCCH with C-DAI value 2 and 5. The other three bits are set to 0. The UE only includes in the HARQ-ACK codebook the HARQ-ACK bits for the PDCCH with C-DAI value 2 and 5, which schedules PDSCH transmissions on TRP 1.

In another option, the size of header in HARQ codebook is determined by the C-DAI in the last PDCCH, irrespectively of the number of TRPs for the PDSCH transmissions for which the HARQ-ACK feedback are triggered. If HARQ-ACK for both two TRPs are triggered, the header bits corresponding to the C-DAI of the detected PDCCHs of the two TRPs can be set to '1'. All other header bits are set to '0'. If HARQ-ACK for only one TRP is triggered, the header bits corresponding to the C-DAI of the detected PDCCHs of the TRP can be set to '1'. Further, all other bits, including the bits corresponding to the C-DAI of the PDCCHs of the other TRP, can be set to '0'. UE only includes HARQ-ACK bits for the PDSCH transmissions corresponding to the PDCCHs with value '1' in the header. If the TRP other than a TRP scheduled by the last PDCCH is triggered, the size of header can equal to CDAI−1.

In one embodiment, the C-DAI in a PDCCH counts the number of PDCCHs that schedule PDSCH transmissions on the two TRPs till the PDCCH, e.g. joint C-DAI across two TRPs. Correspondingly, the PDCCHs/PDSCHs of the two TRPs are ordered by the C-DAI of the PDCCHs. The PDCCH can include an indication on the TRP(s) for the PDSCH transmissions for which the HARQ-ACK feedback are triggered. The indication on the TRP(s) can include {TRP 0 only, TRP 1 only, both TRPs, none} or its subset. Specifically, it can indicate one from {scheduled TRP only, both TRPs, none} or {scheduled TRP only, both TRPs}. The C-DAI doesn't reset, e.g. C-DAI is always incremented by 1 when a new PDCCH is transmitted, irrespectively of new HARQ-ACK codebook is to be generated or not. The UE can be indicated a range of C-DAIs of the PDCCHs for which the HARQ-ACK bits are included in the HARQ-ACK codebook. The indication on the TRP(s) and the indication on the range of C-DAIs may be transmitted separately or jointly in a PDCCH. The size of header in HARQ codebook is determined by the number of C-DAIs in the range, irrespectively of the number of TRPs for the PDSCH transmissions for which the HARQ-ACK feedback are triggered In one option, the range of C-DAIs could be indicated by a starting C-DAI and an ending C-DAI. Alternatively, the range of C-DAIs could be indicated by a starting C-DAI and a number of C-DAI values. Alternatively, the range of C-DAIs could be indicated by an ending C-DAI and a number of C-DAI values. For example, the PDCCH could indicate a starting C-DAI (SC-DAI), so that the HARQ-ACK bits for the PDSCH transmissions which are scheduled by a PDCCH with C-DAI later than the SC-DAI and transmitted on the triggered TRP(s), are included in the HARQ-ACK codebook.

Further, the PDCCH can include an ending C-DAI (EC-DAI) which indicates a last PDSCH transmission that is scheduled by a PDCCH with C-DAI equals to the EC-DAI for which the HARQ-ACK bits are included in the HARQ-ACK codebook. The size of header in HARQ codebook is determined by the EC-DAI in the last PDCCH and the SC-DAI in the last PDCCH, e.g. ECDAI−SCDAI+1, irrespectively of the number of TRPs for the PDSCH transmissions for which the HARQ-ACK feedback are triggered. If a number of C-DAI values in the range are indicated by the last PDCCH, the size of header equals to the number of the C-DAI values. If HARQ-ACK for both two TRPs are triggered, the header bits corresponding to the C-DAI of the detected PDCCHs of the two TRPs can be set to '1'. All other header bits are set to '0'. If HARQ-ACK for only one TRP is triggered, the header bits corresponding to the C-DAI of the detected PDCCHs of the TRP can be set to '1'. Further, all other bits, including the bits corresponding to the C-DAI of the PDCCHs of the other TRP, can be set to '0'. UE only includes HARQ-ACK bits for the PDSCH transmissions corresponding to the PDCCHs with value '1' in the header.

Figure 7:
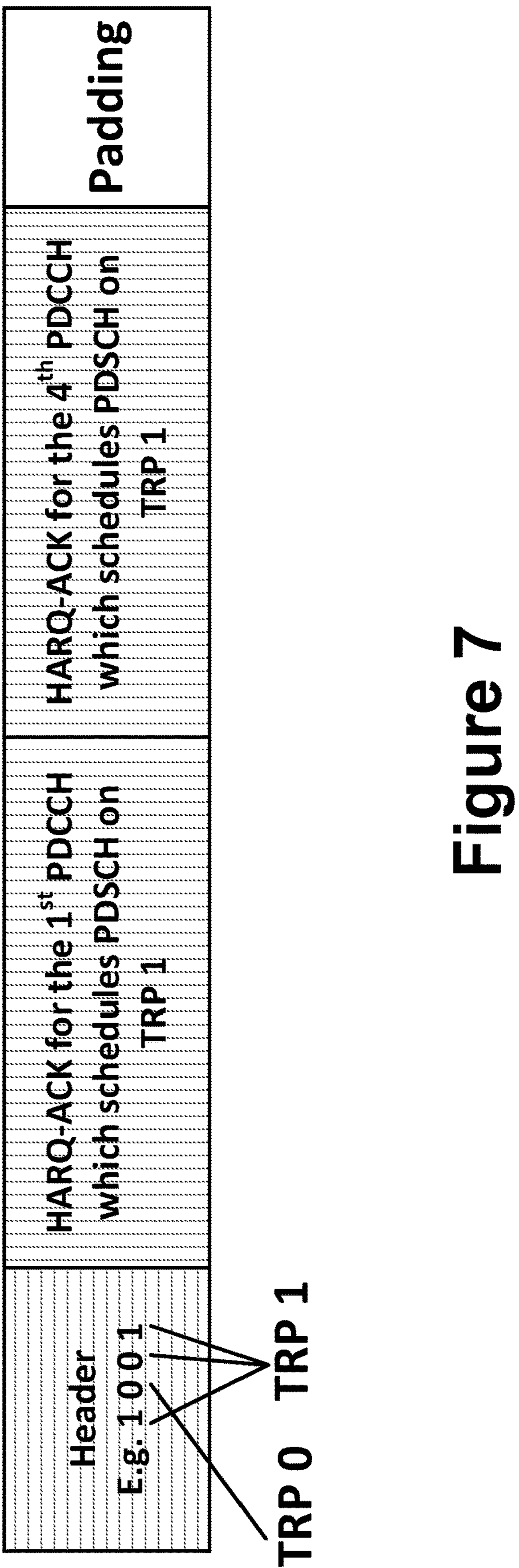
FIG. 7 illustrates an example of header size determined by EC-DAI and SC-DAI with triggered HARQ-ACK for one TRP in accordance with various embodiments.

FIG. 7 illustrates one example of joint C-DAI across two TRPs and triggered HARQ-ACK feedback for only one TRP. In the example, it is assumed that gNB schedules 5 PDSCHs on the two TRPs by 5 PDCCHs with C-DAI with value 1, 2, 3, 4, 5. The PDCCH with C-DAI value 2, 4 and 5 are for PDSCH transmissions on TRP 1 and the other PDCCHs are for TRP 0. It is assumed that the gNB triggers HARQ-ACK feedback for PDSCH transmissions on TRP 1. It is assumed that gNB triggers HARQ-ACK feedback for PDSCH transmissions for a SC-DAI value 2 and EC-DAI value 5. It is further assumed that UE miss the PDCCH with C-DAI value 4. The UE will generate a header of size ECDAI−SCDAI=4 bits. The first and fourth bits are set to value '1' corresponding to PDCCH with C-DAI value 2 and 5. The other two bits are set to 0. The UE only includes in the HARQ-ACK codebook the HARQ-ACK bits for the PDCCH with C-DAI value 2 and 5, which schedules PDSCH transmissions on TRP 1.

In another option, assuming the C-DAI in the last received PDCCH is the ending C-DAI, the range of C-DAIs can be indicated by a starting C-DAI or by a number of C-DAI values. Alternatively, assuming the ending C-DAI can be derived by the C-DAI in the last received PDCCH, the range of C-DAIs can be additionally indicated by a starting C-DAI or by a number of C-DAI values. Denote the C-DAI in the last PDCCH as X, the ending C-DAI of the range can be X+m, m could be 0, 1, −1 or other values. The value m could be implicitly derived or explicitly indicated by the last PDCCH. For example, the size of header in HARQ codebook is determined by the C-DAI in the last PDCCH and the SC-DAI indicated by last PDCCH, e.g. CDAI−SCDAI+1, irrespectively of the number of TRPs for the PDSCH transmissions for which the HARQ-ACK feedback are triggered. If a number of C-DAI values in the range are indicated by the last PDCCH, the size of header equals to the number of the C-DAI values. If HARQ-ACK for both two TRPs are triggered, the header bits corresponding to the C-DAI of the detected PDCCHs of the two TRPs can be set to '1'. All other header bits are set to '0'. If HARQ-ACK for only one TRP is triggered, the header bits corresponding to the C-DAI of the detected PDCCHs of the TRP can be set to '1'. Further, all other bits, including the bits corresponding to the C-DAI of the PDCCHs of the other TRP, can be set to '0'. UE only includes HARQ-ACK bits for the PDSCH transmissions corresponding to the PDCCHs with value '1' in the header. If the TRP other than a TRP scheduled by the last PDCCH is triggered, the size of header can equal to CDAI−SCDAI. That is, the last PDCCH that triggers HARQ-ACK transmission doesn't need to be indicated in the header since it doesn't schedule PDSCH on the other TRP.

Note that for the above options, the starting and length indicator value (SLIV) for C-DAI can be included in the scheduling DCI, which can be used to indicate the starting C-DAI and the number of C-DAIs for HARQ-ACK feedback.

In above options, the PDSCH that is scheduled by the PDCCH with C-DAI equals to the ending C-DAI of the range of C-DAIs may end earlier than the end of the PDSCH that is scheduled by the last PDCCH that triggers HARQ-ACK transmission for the PDCCHs with C-DAIs in the range. By this scheme, if the last PDCCH schedules a PDSCH transmission and a PUCCH or PUSCH, and if there is no sufficient PDSCH processing time between the scheduled PDSCH and the scheduled PUCCH or PUSCH for HARQ-ACK transmission, gNB can still trigger the HARQ-ACK transmission for the other earlier PDSCH transmissions.

Figure 8:
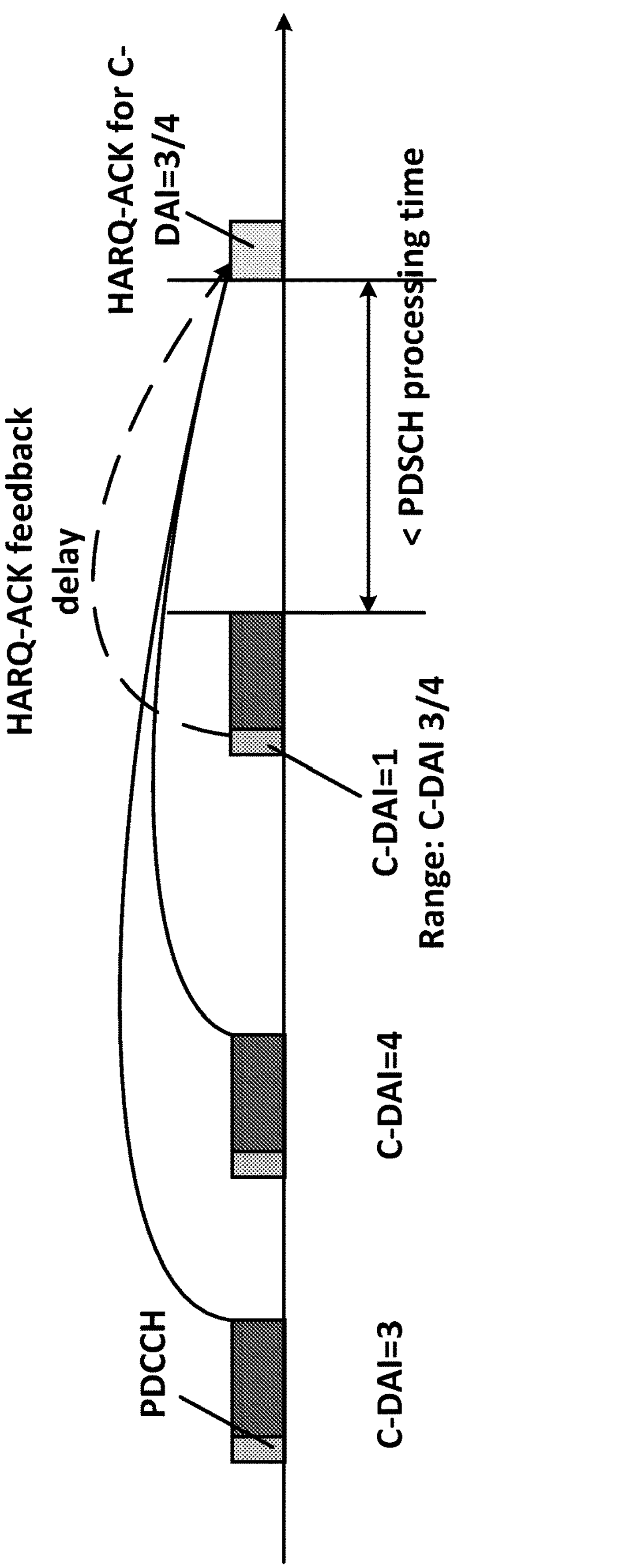
FIG. 8 illustrates an example of HARQ-ACK transmission for PDSCHs except those scheduled by the last PDCCH (C-DAI=1) in accordance with various embodiments.

FIG. 8 illustrates one example of HARQ-ACK transmission for PDSCHs that do not include the PDSCH scheduled by the last PDCCH that triggers the HARQ-ACK transmission. In the example, gNB schedules three PDSCHs by three PDCCHs with C-DAI 3, 4, 1 (C-DAI has 2 bits, so modulo 4 is applied). The PDCCH with C-DAI equals to 1 is the last PDCCH that indicate a UL resource for HARQ-ACK transmission. The HARQ-ACK feedback delay is indicated by the last PDCCH. However, there is not enough processing time between the PDSCH that is scheduled by the last PDCCH and the UL resource indicated by the last PDCCH. In other words, HARQ-ACK for the PDSCH scheduled by the last PDCCH cannot be transmitted in the UL resource. In FIG. 8, gNB can still indicate a range of C-DAI values 3, 4 in the last PDCCH, so that UE can transmit the HARQ-ACK bits for the PDCCHs with C-DAI value 3 and 4.

Figure 9:
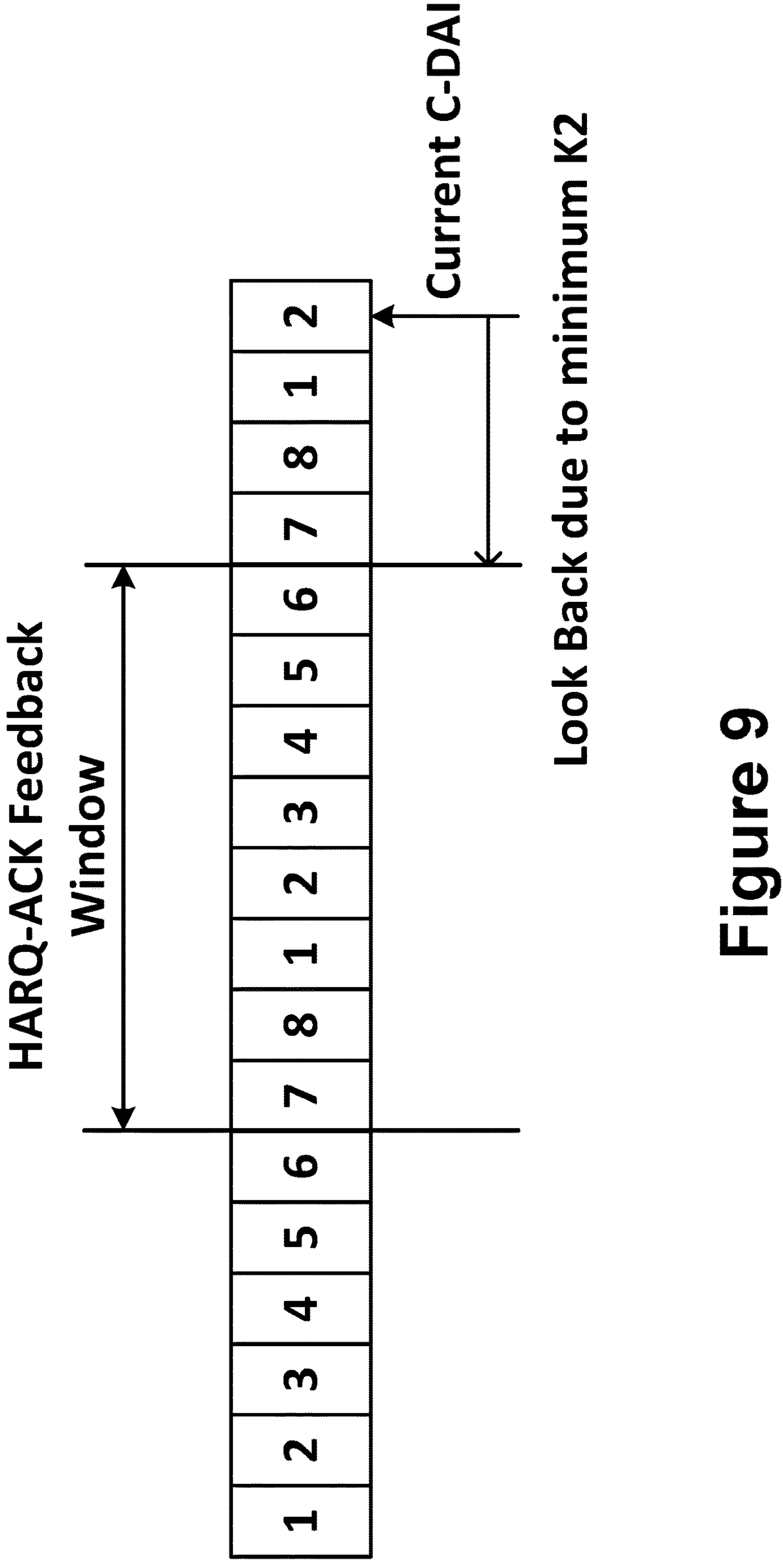
FIG. 9 illustrates an example of HARQ-ACK feedback window defined by a look back value in accordance with various embodiments.

In one embodiment, valid window in which C-DAI values that will be valid for HARQ-ACK feedback can be determined by subtracting the number of DAI values, which will be denoted as look back value, (in modulus calculus) that corresponds to the minimum PDSCH processing time (K2) for HARQ-ACK feedback from the current C-DAI indicated by the DCI that contains the UCI scheduling. FIG. 9 shows an illustration of HARQ-ACK feedback window in which UE could be requested to provide feedback. In the figure, the C-DAI range is from 1 to 8 (e.g. 3 bits), and continuously wraps around. The C-DAI values contained in the scheduling DCI for the UCI is set to 2. The look back value may be derived from the minimum PDSCH processing time and the current DCI, or it could be configured or dynamically indicated by gNB. The starting C-DAI (SC-DAI) indicated or derived by current DCI refers to a C-DAI that is not later than the C-DAI that is obtained by applying look back value to the C-DAI of the current DCI. For example, when SC-DAI is indicated to be 1 (in the FIG. 9 illustration), it would refer the PDSCH that contained C-DAI value of 1 within the HARQ-ACK feedback window, and not the PDSCH that was recently scheduled to the UE.

In one embodiment, in multi-TRP transmission, it is assumed that the PDCCH of TRP 0 must be ordered earlier than TRP 1 if the two PDCCHs are transmitted in the same timing. Denote the C-DAI in the last PDCCH for TRP 0 as X, denote the size of a window of all potential C-DAIs that may be included in the HARQ-ACK codebook as M, to support HARQ-ACK transmission including the PDCCH with C-DAI X+1 for TRP 1, the window includes C-DAI values from X−M+2 to X+1. On the other hand, denote the C-DAI in the last PDCCH for TRP 1 as Y, since PDCCH for TRP 0 must use a C-DAI smaller than Y, the window includes C-DAI values from Y-M+1 to Y.

In one embodiment, in multi-TRP transmission, for a last PDCCH with C-DAI value X, denote the size of a window of all potential C-DAIs that may be included in the HARQ-ACK codebook as M, the window includes C-DAI values from X−M+2 to X+1.

In one embodiment, for a last PDCCH with C-DAI value X, a window of all potential C-DAIs that may be included in the HARQ-ACK codebook is determined with reference to C-DAI value X. The maximum size of the range of C-DAI that is indicated by a PDCCH is only supported for certain ending C-DAI values, e.g. [X−2, X−1, X, X+1]. The range of C-DAI in the window can be encoded by means of the starting and length indicator value (SLIV). A SLIV value indicates the starting C-DAI and the number of C-DAIs of the range. For example, the C-DAIs in the window may be ordered in increasing order starting from index 0. Alternatively, a SLIV value indicates the ending C-DAI and the number of C-DAIs of the range. For example, denote the window size as W, the C-DAIs in the window may be ordered in increasing order from index −W+2 to index 1 or from index −W+1 to index 0. Assuming C-DAI is indicated by M bits, the modulo $2^M$ operation applies to the C-DAI values in each PDCCH.

For example, for a last PDCCH with C-DAI value X, gNB may indicate a C-DAI range with ending C-DAI equals to X. Due to limitation of PDSCH processing time, e.g. FIG. 9 or other reasons, gNB may indicate a C-DAI range with an ending C-DAI that is earlier than X. In multi-TRP operation, when gNB transmit a last PDCCH with C-DAI value X for a TRP, gNB may need to include HARQ-ACK feedback for the PDCCH with C-DAI value X+1 for the other TRP. Herein, the PDSCHs on the two TRPs may be multiplexed in spatial domain and same timing. That is, gNB needs to be capable to indicate a C-DAI range with an ending C-DAI equals to X+1.

In one option, denote the window size as N, the window could consist of C-DAI from X−N+2 to X+1. Herein, only for the case with ending C-DAI X+1, the range of C-DAIs can include up to N C-DAIs. A SLIV based method can be used to indicate a range of C-DAI within the window. The minimum and maximum indicatable number of C-DAIs in the range could be 1 and N respectively. The total number of SLIVs is (N+1)×N/2.

FIG. 10 illustrates one example of the window of size N and SLIV based indication of range of C-DAI of maximum size N. For example, for a maximum window size 8, the total number of SLIVs are (8+1)×8/2=36. For a maximum window size 20, the total number of SLIVs are 21×20/2=210.

In another option, denote the maximum size of the range of C-DAI that is indicated in a PDCCH as N, the window could consist of N+1 C-DAIs, which are from value X-N+1 to X+1. Maximum size N for the range of C-DAIs can be supported for ending C-DAI values X and X+1 respectively. In details, for ending C-DAI X, the range of C-DAIs may start from C-DAI X-N+1. On the other hand, for ending C-DAI X+1, the range of C-DAIs may start from C-DAI X-N+2. A SLIV based method can be used to indicate a range of C-DAI within the window. The minimum and maximum indicatable number of C-DAIs in the range could be 1 and N respectively. The total number of SLIVs is (N+1+2)×N/2.

FIG. 11 illustrates one example of the window of size N+1 and SLIV based indication of range of C-DAI of maximum size N. For example, for a maximum size 8 of the range of C-DAI, the total number of SLIVs are (9+2)×8/2=44. For a maximum size 20 of the range of C-DAI, the total number of SLIVs are (21+2)×20/2=230.

In another option, denote the maximum size of the range of C-DAI that is indicated in a PDCCH as N, the window could consist of N+y C-DAIs, which are from value X−N−y+2 to X+1, y≥2. Maximum size N for the range of C-DAIs can be supported for y+1 ending C-DAI values from X−y−1 to X+1 respectively. for ending C-DAI X+x, y+1≤x≤1, the range of C-DAIs may start from C-DAI X−N+x+1.

A SLIV based method can be used to indicate a range of C-DAI within the window. The minimum and maximum indicatable number of C-DAIs in the range could be 1 and N respectively. The total number of SLIVs is (N+2y+1)×N/2.

FIG. 12 illustrates one example of the window of size N+2 and SLIV based indication of range of C-DAI of maximum size N. For example, for a maximum size 8 of the range of C-DAI, the total number of SLIVs are (8+2+3)×8/2=52. For a maximum size 20 of the range of C-DAI, the total number of SLIVs are (20+2+3)×20/2=250.

In one embodiment, for a last PDCCH with C-DAI value X, a window of all potential C-DAIs that may be included in the HARQ-ACK codebook is determined with reference to C-DAI value X. The range of C-DAI that is indicated in a PDCCH can only end with ending C-DAI value from X−y to X+1. The value y is predefined or configured by high layer signaling. Further, the maximum size of the range of C-DAI is only supported for certain ending C-DAI values, e.g. [X−x, X−x+1, . . . , X+1], x≤y. For other cases with ending C-DAI X−j, x<j≤y, the range of C-DAI can include up to N-j C-DAIs. The range of C-DAI in the window can be encoded by the starting C-DAI and the ending C-DAI. For example, the C-DAIs in the window may be ordered in increasing order starting from index 0. Alternatively, the range of C-DAI in the window can be encoded by the ending C-DAI and a number of C-DAIs. For example, denote the window size as W, the C-DAIs in the window may be ordered in increasing order from index −W+2 to index 1 or from index −W+1 to index 0. Assuming C-DAI is indicated by M bits, the modulo $2^M$ operation applies to the C-DAI values in each PDCCH.

Alternatively, for a last PDCCH with C-DAI value X, the range of C-DAI that is indicated in a PDCCH can only end with ending C-DAI values from X−y to X+1. The value y is predefined or configured by high layer signaling. Further, the maximum size N of the range of C-DAI is only supported for certain ending C-DAI values, e.g. [X−x, X−x+1, . . . , X+1], x≤y. For other cases with ending C-DAI X−j, x<j≤y, the range of C-DAI can include up to N-j C-DAIs. The range of C-DAI can be encoded by the ending C-DAI and a number of C-DAIs, or by the ending C-DAI and a starting C-DAI. For example, denote the window size as W, the C-DAIs in the window may be ordered in increasing order from index −W+2 to index 1 or from index −W+1 to index 0. Assuming C-DAI is indicated by M bits, the modulo $2^M$ operation applies to the C-DAI values in each PDCCH.

In one option, only for the case with ending C-DAI X+1, the range of C-DAIs can include up to N C-DAIs. For other cases with ending C-DAI X−j, j≥0, the range of C-DAI can include up to N−j−1 C-DAIs.

FIG. 13 illustrates one example of the window size N and the range of C-DAIs with ending C-DAI from value X−2 to X+1. The number of SLIVs with ending C-DAI X−2, X−1, X and X+1 are N−3, N−2, N−1 and N respectively. For example, for a maximum window size 8, the total number of SLIVs are 5+6+7+8=26. For a maximum window size 16, the total number of SLIVs are 13+14+15+16=58.

In another option, only for the case with ending C-DAI X and X+1, the range of C-DAIs can include up to N C-DAIs. For other cases with ending C-DAI X−j, j>0 the range of C-DAI can include up to N−j C-DAIs.

FIG. 14 illustrates one example of the window size N+1 and the range of C-DAIs with ending C-DAI from value X−2 to X+1. The number of SLIVs with ending C-DAI X−2, X−1, X and X+1 are N−2, N−1, N and N respectively. For example, for a maximum window size 8, the total number of SLIVs are 6+7+8+8=29. For a maximum window size 16, the total number of SLIVs are 14+15+16+16=61.

In another option, only for the case with ending C-DAI from X−y−1 to X+1, the range of C-DAIs can include up to N C-DAIs. The value y is predefined or configured by high layer signaling. For other cases with ending C-DAI X−j, j>y+1 the range of C-DAI can include up to N−j+y+1 C-DAIs.

FIG. 15 illustrates one example of the window size N+2 and the range of C-DAIs with ending C-DAI from value X−2 to X+1. The number of SLIVs with ending C-DAI X−2, X−1, X and X+1 are N−1, N, N and N respectively. For example, for a maximum window size 8, the total number of SLIVs are 7+8+8+8=31. For a maximum window size 16, the total number of SLIVs are 15+16+16+16=63.

FIG. 16 illustrates one example of the window size N+3 and the range of C-DAIs with ending C-DAI from value X−2 to X+1. The number of SLIVs is N for ending C-DAI X−2, X−1, X and X+1. For example, for a maximum window size 8, the total number of SLIVs are 4×8=32. For a maximum window size 16, the total number of SLIVs are 4×16=64.

In above embodiments and options, the range of C-DAIs including C-DAI X+1 only can be defined as invalid codepoint. By this way, for the above FIG. 10 to 16, the total number of required SLIVs can be reduced by 1. The saved codepoint can be reused for other interpretation. For example, the saved codepoint may indicate that HARQ-ACK transmission is not triggered by the last PDCCH with C-DAI value X.

Systems and Implementations

Figure 17:
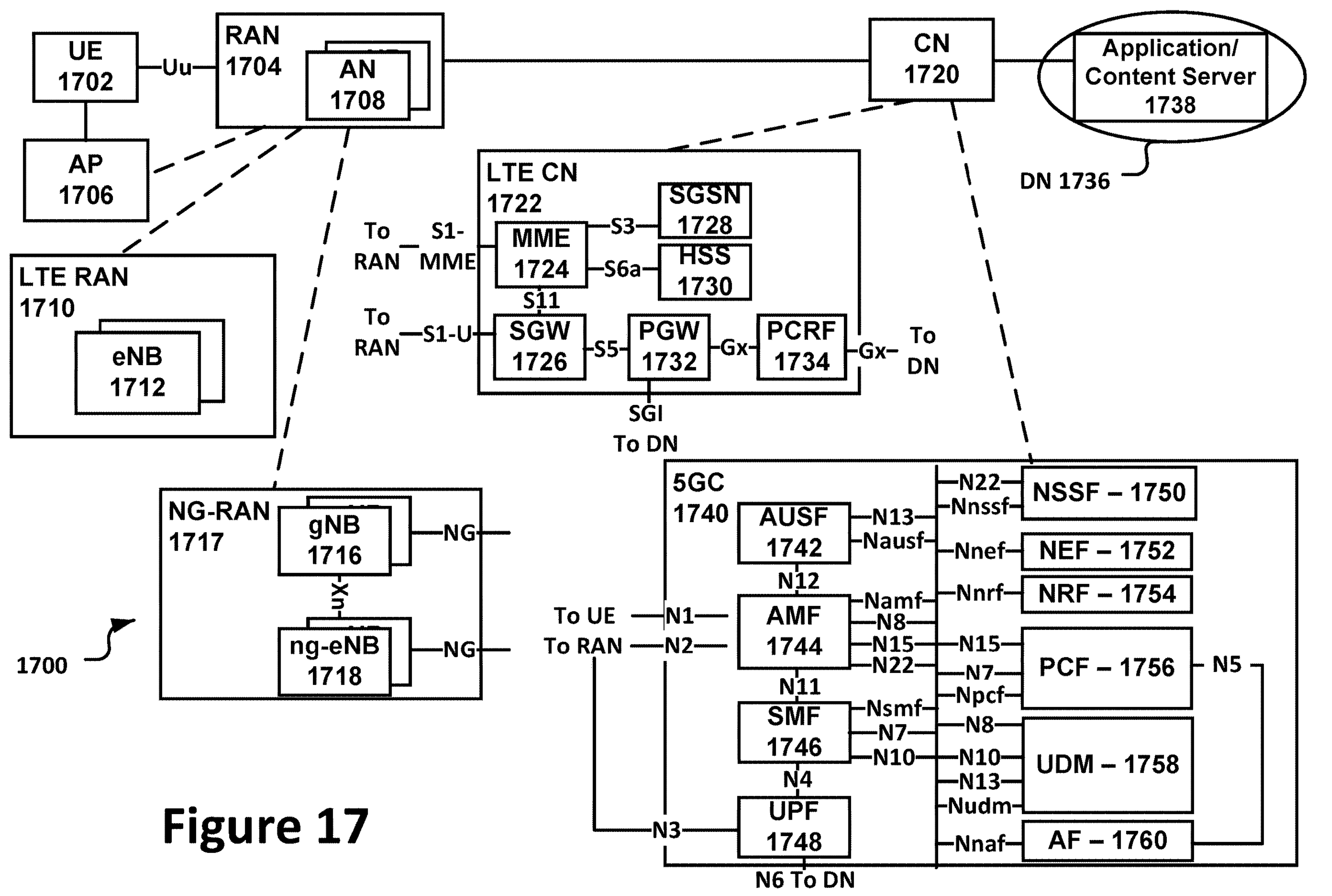
FIG. 17 schematically illustrates a wireless network in accordance with various embodiments.
Figure 18:
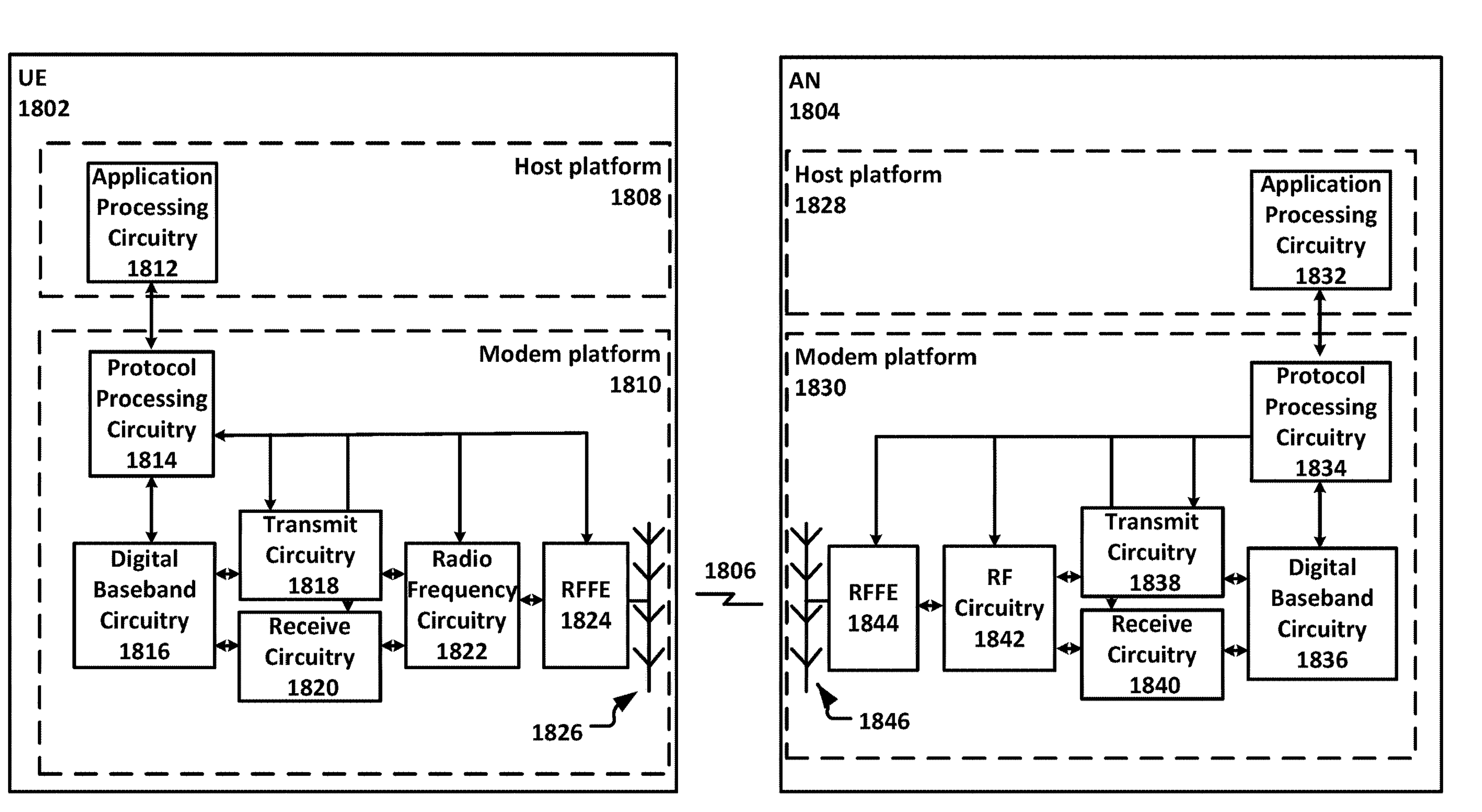
FIG. 18 schematically illustrates components of a wireless network in accordance with various embodiments.
Figure 19:
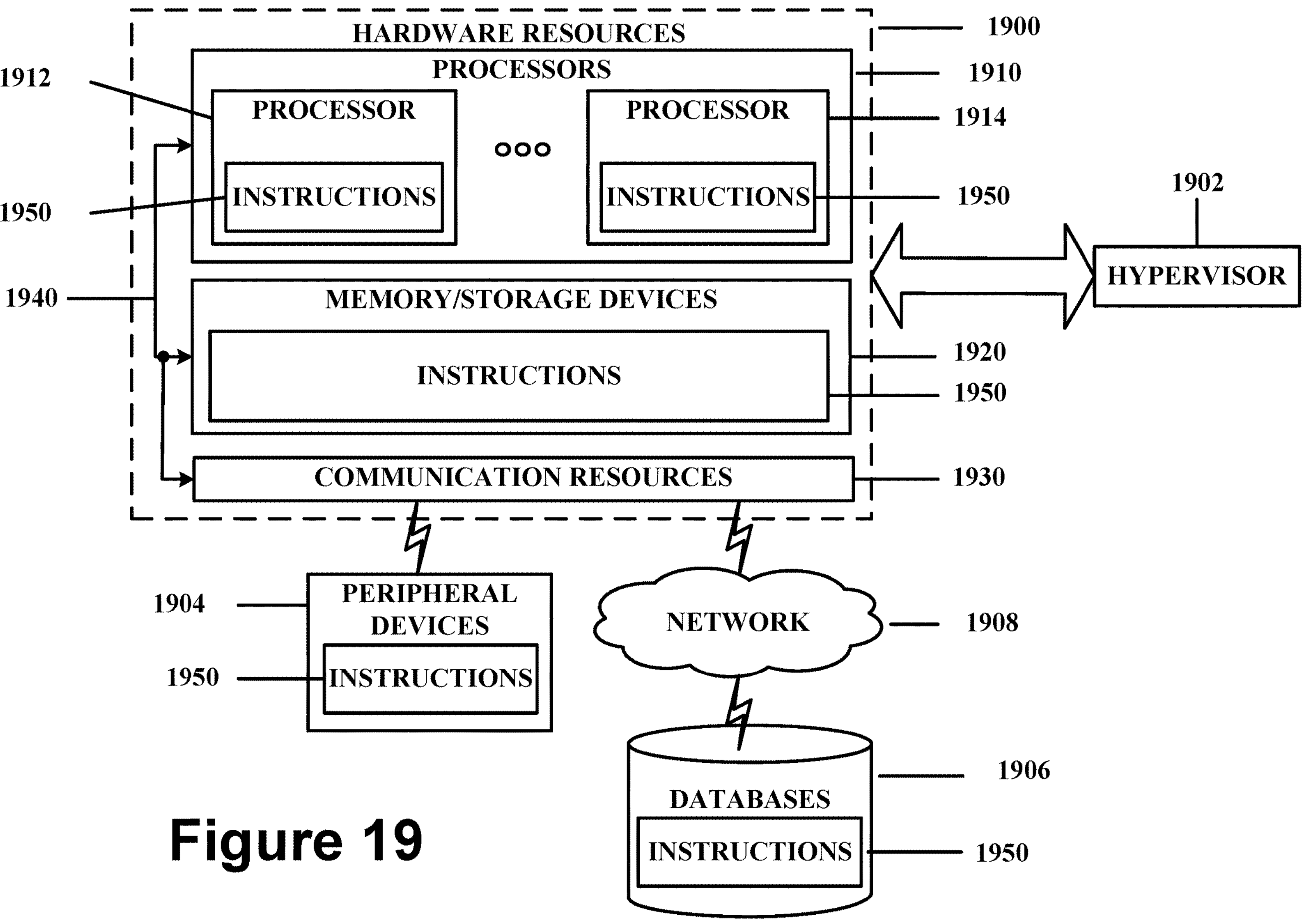
FIG. 19 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 17-19 illustrate various systems, devices, and components that may implement aspects of disclosed embodiments.

FIG. 17 illustrates a network 1700 in accordance with various embodiments. The network 1700 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1700 may include a UE 1702, which may include any mobile or non-mobile computing device designed to communicate with a RAN 1704 via an over-the-air connection. The UE 1702 may be communicatively coupled with the RAN 1704 by a Uu interface. The UE 1702 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1700 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1702 may additionally communicate with an AP 1706 via an over-the-air connection. The AP 1706 may manage a WLAN connection, which may serve to offload some/all network traffic from the RAN 1704. The connection between the UE 1702 and the AP 1706 may be consistent with any IEEE 802.11 protocol, wherein the AP 1706 could be a wireless fidelity (Wi-Fi®) router. In some embodiments, the UE 1702, RAN 1704, and AP 1706 may utilize cellular-WLAN aggregation (for example, LWA/LWIP). Cellular-WLAN aggregation may involve the UE 1702 being configured by the RAN 1704 to utilize both cellular radio resources and WLAN resources.

The RAN 1704 may include one or more access nodes, for example, AN 1708. AN 1708 may terminate air-interface protocols for the UE 1702 by providing access stratum protocols including RRC, PDCP, RLC, MAC, and L1 protocols. In this manner, the AN 1708 may enable data/voice connectivity between CN 1720 and the UE 1702. In some embodiments, the AN 1708 may be implemented in a discrete device or as one or more software entities running on server computers as part of, for example, a virtual network, which may be referred to as a CRAN or virtual baseband unit pool. The AN 1708 be referred to as a BS, gNB, RAN node, eNB, ng-eNB, NodeB, RSU, TRxP, TRP, etc. The AN 1708 may be a macrocell base station or a low power base station for providing femtocells, picocells or other like cells having smaller coverage areas, smaller user capacity, or higher bandwidth compared to macrocells.

In embodiments in which the RAN 1704 includes a plurality of ANs, they may be coupled with one another via an X2 interface (if the RAN 1704 is an LTE RAN) or an Xn interface (if the RAN 1704 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1704 may each manage one or more cells, cell groups, component carriers, etc. to provide the UE 1702 with an air interface for network access. The UE 1702 may be simultaneously connected with a plurality of cells provided by the same or different ANs of the RAN 1704. For example, the UE 1702 and RAN 1704 may use carrier aggregation to allow the UE 1702 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1704 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1702 or AN 1708 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1704 may be an LTE RAN 1710 with eNBs, for example, eNB 1712. The LTE RAN 1710 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1704 may be an NG-RAN 1714 with gNBs, for example, gNB 1716, or ng-eNBs, for example, ng-eNB 1718. The gNB 1716 may connect with 5G-enabled UEs using a 5G NR interface. The gNB 1716 may connect with a 5G core through an NG interface, which may include an N2 interface or an N3 interface. The ng-eNB 1718 may also connect with the 5G core through an NG interface, but may connect with a UE via an LTE air interface. The gNB 1716 and the ng-eNB 1718 may connect with each other over an Xn interface.

In some embodiments, the NG interface may be split into two parts, an NG user plane (NG-U) interface, which carries traffic data between the nodes of the NG-RAN 1714 and a UPF 1748 (e.g., N3 interface), and an NG control plane (NG-C) interface, which is a signaling interface between the nodes of the NG-RAN 1714 and an AMF 1744 (e.g., N2 interface).

The NG-RAN 1714 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1702 can be configured with multiple BWPs where each BWP configuration has a different SCS. When a BWP change is indicated to the UE 1702, the SCS of the transmission is changed as well. Another use case example of BWP is related to power saving. In particular, multiple BWPs can be configured for the UE 1702 with different amount of frequency resources (for example, PRBs) to support data transmission under different traffic loading scenarios. A BWP containing a smaller number of PRBs can be used for data transmission with small traffic load while allowing power saving at the UE 1702 and in some cases at the gNB 1716. A BWP containing a larger number of PRBs can be used for scenarios with higher traffic load.

The RAN 1704 is communicatively coupled to CN 1720 that includes network elements to provide various functions to support data and telecommunications services to customers/subscribers (for example, users of UE 1702). The components of the CN 1720 may be implemented in one physical node or separate physical nodes. In some embodiments, NFV may be utilized to virtualize any or all of the functions provided by the network elements of the CN 1720 onto physical compute/storage resources in servers, switches, etc. A logical instantiation of the CN 1720 may be referred to as a network slice, and a logical instantiation of a portion of the CN 1720 may be referred to as a network sub-slice.

In some embodiments, the CN 1720 may be an LTE CN 1722, which may also be referred to as an EPC. The LTE CN 1722 may include MME 1724, SGW 1726, SGSN 1728, HSS 1730, PGW 1732, and PCRF 1734 coupled with one another over interfaces (or "reference points") as shown. Functions of the elements of the LTE CN 1722 may be briefly introduced as follows.

The MME 1724 may implement mobility management functions to track a current location of the UE 1702 to facilitate paging, bearer activation/deactivation, handovers, gateway selection, authentication, etc.

The SGW 1726 may terminate an Si interface toward the RAN and route data packets between the RAN and the LTE CN 1722. The SGW 1726 may be a local mobility anchor point for inter-RAN node handovers and also may provide an anchor for inter-3GPP mobility. Other responsibilities may include lawful intercept, charging, and some policy enforcement.

The SGSN 1728 may track a location of the UE 1702 and perform security functions and access control. In addition, the SGSN 1728 may perform inter-EPC node signaling for mobility between different RAT networks; PDN and S-GW selection as specified by MME 1724; MME selection for handovers; etc. The S3 reference point between the MME 1724 and the SGSN 1728 may enable user and bearer information exchange for inter-3GPP access network mobility in idle/active states.

The HSS 1730 may include a database for network users, including subscription-related information to support the network entities' handling of communication sessions. The HSS 1730 can provide support for routing/roaming, authentication, authorization, naming/addressing resolution, location dependencies, etc. An S6a reference point between the HSS 1730 and the MME 1724 may enable transfer of subscription and authentication data for authenticating/authorizing user access to the LTE CN 1720.

The PGW 1732 may terminate an SGi interface toward a data network (DN) 1736 that may include an application/content server 1738. The PGW 1732 may route data packets between the LTE CN 1722 and the data network 1736. The PGW 1732 may be coupled with the SGW 1726 by an S5 reference point to facilitate user plane tunneling and tunnel management. The PGW 1732 may further include a node for policy enforcement and charging data collection (for example, PCEF). Additionally, the SGi reference point between the PGW 1732 and the data network 1736 may be an operator external public, a private PDN, or an intra-operator packet data network, for example, for provision of IMS services. The PGW 1732 may be coupled with a PCRF 1734 via a Gx reference point.

The PCRF 1734 is the policy and charging control element of the LTE CN 1722. The PCRF 1734 may be communicatively coupled to the app/content server 1738 to determine appropriate QoS and charging parameters for service flows. The PCRF 1732 may provision associated rules into a PCEF (via Gx reference point) with appropriate TFT and QCI.

In some embodiments, the CN 1720 may be a 5GC 1740. The 5GC 1740 may include an AUSF 1742, AMF 1744, SMF 1746, UPF 1748, NSSF 1750, NEF 1752, NRF 1754, PCF 1756, UDM 1758, and AF 1760 coupled with one another over interfaces (or "reference points") as shown. Functions of the elements of the 5GC 1740 may be briefly introduced as follows.

The AUSF 1742 may store data for authentication of UE 1702 and handle authentication-related functionality. The AUSF 1742 may facilitate a common authentication framework for various access types. In addition to communicating with other elements of the 5GC 1740 over reference points as shown, the AUSF 1742 may exhibit an Nausf service-based interface.

The AMF 1744 may allow other functions of the 5GC 1740 to communicate with the UE 1702 and the RAN 1704 and to subscribe to notifications about mobility events with respect to the UE 1702. The AMF 1744 may be responsible for registration management (for example, for registering UE 1702), connection management, reachability management, mobility management, lawful interception of AMF-related events, and access authentication and authorization. The AMF 1744 may provide transport for SM messages between the UE 1702 and the SMF 1746, and act as a transparent proxy for routing SM messages. AMF 1744 may also provide transport for SMS messages between UE 1702 and an SMSF. AMF 1744 may interact with the AUSF 1742 and the UE 1702 to perform various security anchor and context management functions. Furthermore, AMF 1744 may be a termination point of a RAN CP interface, which may include or be an N2 reference point between the RAN 1704 and the AMF 1744; and the AMF 1744 may be a termination point of NAS (N1) signaling, and perform NAS ciphering and integrity protection. AMF 1744 may also support NAS signaling with the UE 1702 over an N3 IWF interface.

The SMF 1746 may be responsible for SM (for example, session establishment, tunnel management between UPF 1748 and AN 1708); UE IP address allocation and management (including optional authorization); selection and control of UP function; configuring traffic steering at UPF 1748 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1744 over N2 to AN 1708; and determining SSC mode of a session. SM may refer to management of a PDU session, and a PDU session or "session" may refer to a PDU connectivity service that provides or enables the exchange of PDUs between the UE 1702 and the data network 1736.

The UPF 1748 may act as an anchor point for intra-RAT and inter-RAT mobility, an external PDU session point of interconnect to data network 1736, and a branching point to support multi-homed PDU session. The UPF 1748 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1748 may include an uplink classifier to support routing traffic flows to a data network.

The NSSF 1750 may select a set of network slice instances serving the UE 1702. The NSSF 1750 may also determine allowed NSSAI and the mapping to the subscribed S-NSSAIs, if needed. The NSSF 1750 may also determine the AMF set to be used to serve the UE 1702, or a list of candidate AMFs based on a suitable configuration and possibly by querying the NRF 1754. The selection of a set of network slice instances for the UE 1702 may be triggered by the AMF 1744 with which the UE 1702 is registered by interacting with the NSSF 1750, which may lead to a change of AMF. The NSSF 1750 may interact with the AMF 1744 via an N22 reference point; and may communicate with another NSSF in a visited network via an N31 reference point (not shown). Additionally, the NSSF 1750 may exhibit an Nnssf service-based interface.

The NEF 1752 may securely expose services and capabilities provided by 3GPP network functions for third party, internal exposure/re-exposure, AFs (e.g., AF 1760), edge computing or fog computing systems, etc. In such embodiments, the NEF 1752 may authenticate, authorize, or throttle the AFs. NEF 1752 may also translate information exchanged with the AF 1760 and information exchanged with internal network functions. For example, the NEF 1752 may translate between an AF-Service-Identifier and an internal 5GC information. NEF 1752 may also receive information from other NFs based on exposed capabilities of other NFs. This information may be stored at the NEF 1752 as structured data, or at a data storage NF using standardized interfaces. The stored information can then be re-exposed by the NEF 1752 to other NFs and AFs, or used for other purposes such as analytics. Additionally, the NEF 1752 may exhibit an Nnef service-based interface.

The NRF 1754 may support service discovery functions, receive NF discovery requests from NF instances, and provide the information of the discovered NF instances to the NF instances. NRF 1754 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1754 may exhibit the Nnrf service-based interface.

The PCF 1756 may provide policy rules to control plane functions to enforce them, and may also support unified policy framework to govern network behavior. The PCF 1756 may also implement a front end to access subscription information relevant for policy decisions in a UDR of the UDM 1758. In addition to communicating with functions over reference points as shown, the PCF 1756 exhibit an Npcf service-based interface.

The UDM 1758 may handle subscription-related information to support the network entities' handling of communication sessions, and may store subscription data of UE 1702. For example, subscription data may be communicated via an N8 reference point between the UDM 1758 and the AMF 1744. The UDM 1758 may include two parts, an application front end and a UDR. The UDR may store subscription data and policy data for the UDM 1758 and the PCF 1756, and/or structured data for exposure and application data (including PFDs for application detection, application request information for multiple UEs 1702) for the NEF 1752. The Nudr service-based interface may be exhibited by the UDR 221 to allow the UDM 1758, PCF 1756, and NEF 1752 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1758 may exhibit the Nudm service-based interface.

The AF 1760 may provide application influence on traffic routing, provide access to NEF, and interact with the policy framework for policy control.

In some embodiments, the 5GC 1740 may enable edge computing by selecting operator/3$^{rd}$ party services to be geographically close to a point that the UE 1702 is attached to the network. This may reduce latency and load on the network. To provide edge-computing implementations, the 5GC 1740 may select a UPF 1748 close to the UE 1702 and execute traffic steering from the UPF 1748 to data network 1736 via the N6 interface. This may be based on the UE subscription data, UE location, and information provided by the AF 1760. In this way, the AF 1760 may influence UPF (re)selection and traffic routing. Based on operator deployment, when AF 1760 is considered to be a trusted entity, the network operator may permit AF 1760 to interact directly with relevant NFs. Additionally, the AF 1760 may exhibit an Naf service-based interface.

The data network 1736 may represent various network operator services, Internet access, or third party services that may be provided by one or more servers including, for example, application/content server 1738.

FIG. 18 schematically illustrates a wireless network 1800 in accordance with various embodiments. The wireless network 1800 may include a UE 1802 in wireless communication with an AN 1804. The UE 1802 and AN 1804 may be similar to, and substantially interchangeable with, like-named components described elsewhere herein.

The UE 1802 may be communicatively coupled with the AN 1804 via connection 1806. The connection 1806 is illustrated as an air interface to enable communicative coupling, and can be consistent with cellular communications protocols such as an LTE protocol or a 5G NR protocol operating at mmWave or sub-6 GHz frequencies.

The UE 1802 may include a host platform 1808 coupled with a modem platform 1810. The host platform 1808 may include application processing circuitry 1812, which may be coupled with protocol processing circuitry 1814 of the modem platform 1810. The application processing circuitry 1812 may run various applications for the UE 1802 that source/sink application data. The application processing circuitry 1812 may further implement one or more layer operations to transmit/receive application data to/from a data network. These layer operations may include transport (for example UDP) and Internet (for example, IP) operations The protocol processing circuitry 1814 may implement one or more of layer operations to facilitate transmission or reception of data over the connection 1806. The layer operations implemented by the protocol processing circuitry 1814 may include, for example, MAC, RLC, PDCP, RRC and NAS operations.

The modem platform 1810 may further include digital baseband circuitry 1816 that may implement one or more layer operations that are "below" layer operations performed by the protocol processing circuitry 1814 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1810 may further include transmit circuitry 1818, receive circuitry 1820, RF circuitry 1822, and RF front end (RFFE) 1824, which may include or connect to one or more antenna panels 1826. Briefly, the transmit circuitry 1818 may include a digital-to-analog converter, mixer, intermediate frequency (IF) components, etc.; the receive circuitry 1820 may include an analog-to-digital converter, mixer, IF components, etc.; the RF circuitry 1822 may include a low-noise amplifier, a power amplifier, power tracking components, etc.; RFFE 1824 may include filters (for example, surface/bulk acoustic wave filters), switches, antenna tuners, beamforming components (for example, phase-array antenna components), etc. The selection and arrangement of the components of the transmit circuitry 1818, receive circuitry 1820, RF circuitry 1822, RFFE 1824, and antenna panels 1826 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1814 may include one or more instances of control circuitry (not shown) to provide control functions for the transmit/receive components.

A UE reception may be established by and via the antenna panels 1826, RFFE 1824, RF circuitry 1822, receive circuitry 1820, digital baseband circuitry 1816, and protocol processing circuitry 1814. In some embodiments, the antenna panels 1826 may receive a transmission from the AN 1804 by receive-beamforming signals received by a plurality of antennas/antenna elements of the one or more antenna panels 1826.

A UE transmission may be established by and via the protocol processing circuitry 1814, digital baseband circuitry 1816, transmit circuitry 1818, RF circuitry 1822, RFFE 1824, and antenna panels 1826. In some embodiments, the transmit components of the UE 1804 may apply a spatial filter to the data to be transmitted to form a transmit beam emitted by the antenna elements of the antenna panels 1826.

Similar to the UE 1802, the AN 1804 may include a host platform 1828 coupled with a modem platform 1830. The host platform 1828 may include application processing circuitry 1832 coupled with protocol processing circuitry 1834 of the modem platform 1830. The modem platform may further include digital baseband circuitry 1836, transmit circuitry 1838, receive circuitry 1840, RF circuitry 1842, RFFE circuitry 1844, and antenna panels 1846. The components of the AN 1804 may be similar to and substantially interchangeable with like-named components of the UE 1802. In addition to performing data transmission/reception as described above, the components of the AN 1808 may perform various logical functions that include, for example, RNC functions such as radio bearer management, uplink and downlink dynamic radio resource management, and data packet scheduling.

FIG. 19 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 19 shows a diagrammatic representation of hardware resources 1900 including one or more processors (or processor cores) 1910, one or more memory/storage devices 1920, and one or more communication resources 1930, each of which may be communicatively coupled via a bus 1940 or other interface circuitry. For embodiments where node virtualization (e.g., NFV) is utilized, a hypervisor 1902 may be executed to provide an execution environment for one or more network slices/sub-slices to utilize the hardware resources 1900.

The processors 1910 may include, for example, a processor 1912 and a processor 1914. The processors 1910 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 1920 may include main memory, disk storage, or any suitable combination thereof. The memory/storage devices 1920 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1930 may include interconnection or network interface controllers, components, or other suitable devices to communicate with one or more peripheral devices 1904 or one or more databases 1906 or other network elements via a network 1908. For example, the communication resources 1930 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1950 may comprise software, a program, an application, an applet, an app, or other executable code for causing at least any of the processors 1910 to perform any one or more of the methodologies discussed herein. The instructions 1950 may reside, completely or partially, within at least one of the processors 1910 (e.g., within the processor's cache memory), the memory/storage devices 1920, or any suitable combination thereof. Furthermore, any portion of the instructions 1950 may be transferred to the hardware resources 1900 from any combination of the peripheral devices 1904 or the databases 1906. Accordingly, the memory of processors 1910, the memory/storage devices 1920, the peripheral devices 1904, and the databases 1906 are examples of computer-readable and machine-readable media.

Example Procedures

In some embodiments, the electronic device(s), network(s), system(s), chip(s) or component(s), or portions or implementations thereof, of FIGS. 17-19, or some other figure herein, may be configured to perform one or more processes, techniques, or methods as described herein, or portions thereof. One such process is depicted in FIG. 20, which may be performed by a user equipment (UE) or portion thereof in some embodiments. In this example, process 2000 includes, at 2005, retrieving, from a memory, downlink control information (DCI) associated with a scheduled downlink (DL) transmission to be received by a user equipment (UE). The process further includes, at 2010, determining, based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission. The process further includes, at 2015, encoding a message for transmission to a next-generation NodeB (gNB) that includes the HARQ-ACK feedback information.

Another such example is illustrated in FIG. 21. In this example, process 2100 includes, at 2105, receiving, by a user equipment (UE) from a next-generation NodeB (gNB), downlink control information (DCI) associated with a scheduled downlink (DL) transmission to be received by the UE. The process further includes, at 2110, determining, by the UE based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission. The process further includes, at 2115, encoding, by the UE, a message for transmission to a next-generation NodeB (gNB) that includes the HARQ-ACK feedback information Another such example is illustrated in FIG. 22. In this example, process 2200 includes, at 2205, receiving, by a user equipment (UE) from a next-generation NodeB (gNB), downlink control information (DCI) associated with a scheduled downlink (DL) transmission to be received by the UE. The process further includes, at 2210, determining, by the UE based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission, wherein the time domain bundling size is based on an uplink control information (UCI) payload size and the HARQ-ACK codebook size. The process further includes, at 2215, encoding, by the UE, a message for transmission to a next-generation NodeB (gNB) that includes the HARQ-ACK feedback information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 may include a method of wireless communication to transmit HARQ-ACK information for above 52.6 GHz carrier frequency.

Example 2 may include the method of example 1 or some other example herein, wherein time domain bundling of HARQ-ACK feedback is performed per DCI.

Example 3 may include the method of example 1 or some other example herein, when HARQ-ACK feedback for PDSCH scheduled by fallback DCI and non-fallback DCI are included in a single UCI report, no time bundling is applied for the HARQ-ACK feedback for PDSCH scheduled by fallback DCI.

Example 4 may include the method of example 3 or some other example herein, separate time domain bundling sizes are applied for the HARQ-ACK feedback for PDSCH scheduled by fallback DCI and non-fallback DCI, respectively.

Example 5 may include the method of example 1 or some other example herein, wherein in multi-TRP transmission, the PDCCHs/PDSCHs of the two TRPs are ordered by the C-DAI of the PDCCHs and the total DAI (T-DAI) of the last PDCCH.

Example 6 may include the method of example 5 or some other example herein, wherein the T-DAI in a PDCCH indicates the total number of PDCCHs that schedule PDSCH transmissions on the other TRP.

Example 7 may include the method of example 6 or some other example herein, the header of the HARQ codebook includes the bits determined by the C-DAI in the last PDCCH for a TRP and the bits determined by the T-DAI in the last PDCCH for the other TRP.

Example 8 may include the method of example 5 or some other example herein wherein, the T-DAI in a PDCCH indicates the total number of PDCCHs that schedule PDSCH transmissions on the two TRPs.

Example 9 may include the method of example 8 or some other example herein, wherein the header size of the HARQ codebook is determined by the T-DAI, and the PDCCHs for one TRP are mapped from the beginning of the header, while the PDCCHs of the other TRP are mapped from the end of the header.

Example 10 may include the method of example 1, or some other example herein, wherein in multi-TRP transmission, the C-DAI in a PDCCH counts the number of PDCCHs that schedule PDSCH transmissions on the two TRPs till the PDCCH.

Example 11 may include the method of example 10 or some other example herein, wherein the T-DAI in a PDCCH indicates the total number of PDCCHs that schedule PDSCH transmissions on the two TRPs.

Example 12 may include the method of example 11 or some other example herein, wherein the size of header in HARQ codebook is determined by the T-DAI in the last PDCCH, irrespectively of the number of TRPs for the PDSCH transmissions for which the HARQ-ACK feedback are triggered.

Example 13 may include the method of example 10 or some other example herein, wherein a range of C-DAIs of the PDCCHs for which the HARQ-ACK bits are included in the HARQ-ACK codebook are indicated in the last PDCCH.

Example 14 may include the method of example 13 or some other example herein, wherein the range is indicated by the starting C-DAI and the ending C-DAI, or by the starting C-DAI and a number of C-DAI values.

Example 15 may include the method of example 13 or some other example herein, wherein the ending C-DAI equals to or is derived by the C-DAI in the last received PDCCH, the range is indicated by a starting C-DAI or by a number of C-DAI values.

Example 16 may include the method of examples 13-15 or some other example herein, wherein the range of C-DAI is encoded by means of the starting and length indicator value (SLIV).

Example 17 may include the method of examples 13-15 or some other example herein, wherein the range of C-DAI that is indicated in a PDCCH only ends with ending C-DAI value from $X-y$ to $X+1$.

Example 18 may include the method of examples 16 or 17 or some other example herein, wherein maximum size for the range of C-DAIs is only supported for ending C-DAI values $X+1$.

Example 19 may include the method of examples 16 or 17 or some other example herein, wherein maximum size for the range of C-DAIs is only supported for ending C-DAI values $X$ and $X+1$ respectively Example 20 may include the method of examples 16 or 17 or some other example herein, wherein maximum size for the range of C-DAIs is only supported for $y+1$ ending C-DAI values from $X-y-1$ to $X+1$ respectively.

Example 21 may include the method of examples 13 to 15 or some other example herein, wherein the size of header in HARQ codebook is determined by the ending C-DAI and the starting C-DAI, irrespectively of the number of TRPs for the PDSCH transmissions for which the HARQ-ACK feedback are triggered.

Example 22 may include the method of examples 13 to 15 or some other example herein, wherein the size of header in HARQ codebook is determined by the indicated number of the C-DAI values.

Example 23 may include the method of examples 10 to 22 or some other example herein, wherein the header bits corresponding to the C-DAI of the detected PDCCHs of the triggered TRP(s) are set to '1'.

Example 24 may include the method of examples 10 to 22 or some other example herein, wherein if HARQ-ACK for only one TRP is triggered, the header bits corresponding to the C-DAI of the PDCCHs of the other TRP are set to '0'.

Example 25 may include a method comprising:

- determining HARQ-ACK feedback using time domain bundling; and
- encoding the HARQ-ACK feedback for transmission to a gNB.

Example 26 may include the method of example 25 or some other example herein, wherein the time domain bundling of HARQ-ACK feedback is performed per DCI.

Example 27 may include the method of example 25 or some other example herein, wherein the HARQ-ACK feedback is for one or more PDSCHs scheduled by fallback DCI and non-fallback DCI and is included in a single UCI report, and wherein no time bundling is applied for the HARQ-ACK feedback for the PDSCH scheduled by fallback DCI.

Example 28 may include the method of example 25 or some other example herein, further comprising determining a time domain bundling size based on whether the HARQ-ACK feedback is for a PDSCH scheduled by a fallback DCI or a non-fallback DCI.

Example 29 may include the method of example 25-28 or some other example herein, wherein the HARQ-ACK feedback is for a range of C-DAIs of PDCCHs.

Example 30 may include the method of example 29 or some other example herein, wherein the range of C-DAIs is indicated by a previous PDCCH.

Example 31 may include the method of example 29-30 or some other example herein, wherein the range of C-DAIs is indicated by a start and length indicator value (SLIV).

Example 32 may include the method of example 25-31 or some other example herein, wherein the method is performed by a UE or a portion thereof.

Example X1 includes an apparatus comprising:

- memory to store downlink control information (DCI) associated with a scheduled downlink (DL) transmission to be received by a user equipment (UE); and
- processing circuitry, coupled with the memory, to:
  - determine, based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission; and
  - encode a message for transmission to a next-generation NodeB (gNB) that includes the HARQ-ACK feedback information.

Example X2 includes the apparatus of Example X1 or some other example herein, wherein a header of a HARQ-ACK codebook is to indicate whether each respective DCI from a plurality of DCIs is detected or not.

Example X3 includes the apparatus of Example X1 or some other example herein, wherein the time domain bundling size is based on an uplink control information (UCI) payload size and the HARQ-ACK codebook size.

Example X4 includes the apparatus of Example X3 or some other example herein, wherein separate time domain bundling sizes are applied to HARQ-ACK feedback information for PDSCH scheduled by fallback DCI and to HARQ-ACK feedback information for PDSCH scheduled by non-fallback DCI.

Example X5 includes the apparatus of Example X1 or some other example herein, wherein the HARQ-ACK feedback information includes HARQ-ACK information for PDSCH transmissions transmitted by up to two transmission reception points (TRPs).

Example X6 includes the apparatus of Example X5 or some other example herein, wherein the HARQ-ACK feedback information includes an indication of a counter downlink assignment index (C-DAI) that is to count a number of physical downlink control channel (PDCCH) transmissions scheduling PDSCH transmissions on the at least two TRPs, wherein: the C-DAI resets to a value of 1 when a new HARQ-ACK codebook is to be generated, or the C-DAI does not reset.

Example X7 includes the apparatus of Example X6 or some other example herein, wherein the HARQ-ACK feedback information includes a header of a HARQ-ACK codebook, wherein a size of the header is determined by a number of C-DAIs in a range of C-DAIs.

Example X8 includes the apparatus of any of examples X1-X7 or some other example herein, wherein the HARQ-ACK feedback information is associated with a carrier frequency above 52.6 GHz.

Example X9 includes one or more computer-readable media storing instructions that, when executed by one or more processors, cause a user equipment (UE) to:

- receive, from a next-generation NodeB (gNB), downlink control information (DCI) associated with a scheduled downlink (DL) transmission to be received by the UE;
- determine, based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission; and
- encode a message for transmission to a next-generation NodeB (gNB) that includes the HARQ-ACK feedback information.

Example X10 includes the one or more computer-readable media of example X9 or some other example herein, wherein a header of a HARQ-ACK codebook is to indicate whether each respective DCI from a plurality of DCIs is detected or not.

Example X11 includes the one or more computer-readable media of example X9 or some other example herein, wherein the time domain bundling size is based on an uplink control information (UCI) payload size and the HARQ-ACK codebook size.

Example X12 includes the one or more computer-readable media of example X11 or some other example herein, wherein separate time domain bundling sizes are applied to HARQ-ACK feedback information for PDSCH scheduled by fallback DCI and to HARQ-ACK feedback information for PDSCH scheduled by non-fallback DCI.

Example X13 includes the one or more computer-readable media of example X9 or some other example herein, wherein the HARQ-ACK feedback information includes HARQ-ACK information for PDSCH transmissions transmitted by up to two transmission reception points (TRPs).

Example X14 includes the one or more computer-readable media of example X13 or some other example herein, wherein the HARQ-ACK feedback information includes an indication of a counter downlink assignment index (C-DAI) that is to count a number of physical downlink control channel (PDCCH) transmissions scheduling PDSCH transmissions on the at least two TRPs, wherein: the C-DAI resets to a value of 1 when a new HARQ-ACK codebook is to be generated, or the C-DAI does not reset.

Example X15 includes the one or more computer-readable media of example X14 or some other example herein, wherein the HARQ-ACK feedback information includes a header of a HARQ-ACK codebook, wherein a size of the header is determined by a number of C-DAIs in a range of C-DAIs.

Example X16 includes the one or more computer-readable media of any of examples X9-X15 or some other example herein, wherein the HARQ-ACK feedback information is associated with a carrier frequency above 52.6 GHz.

Example X17 includes one or more computer-readable media storing instructions that, when executed by one or more processors, cause a user equipment (UE) to:

receive, from a next-generation NodeB (gNB), downlink control information (DCI) associated with a scheduled downlink (DL) transmission to be received by the UE;

determine, based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission, wherein the time domain bundling size is based on an uplink control information (UCI) payload size and the HARQ-ACK codebook size; and encode a message for transmission to a next-generation NodeB (gNB) that includes the HARQ-ACK feedback information.

Example X18 includes the one or more computer-readable media of example X17 or some other example herein, wherein a header of a HARQ-ACK codebook is to indicate whether each respective DCI from a plurality of DCIs is detected or not.

Example X19 includes the one or more computer-readable media of example X17 or some other example herein, wherein separate time domain bundling sizes are applied to HARQ-ACK feedback information for PDSCH scheduled by fallback DCI and to HARQ-ACK feedback information for PDSCH scheduled by non-fallback DCI.

Example X20 includes the one or more computer-readable media of example X19 or some other example herein, wherein the HARQ-ACK feedback information includes HARQ-ACK information for PDSCH transmissions transmitted by up to two transmission reception points (TRPs).

Example X21 includes the one or more computer-readable media of example X20 or some other example herein, wherein the HARQ-ACK feedback information includes an indication of a counter downlink assignment index (C-DAI) that is to count a number of physical downlink control channel (PDCCH) transmissions scheduling PDSCH transmissions on the at least two TRPs, wherein: the C-DAI resets to a value of 1 when a new HARQ-ACK codebook is to be generated, or the C-DAI does not reset.

Example X22 includes the one or more computer-readable media of example X21 or some other example herein, wherein the HARQ-ACK feedback information includes a header of a HARQ-ACK codebook, wherein a size of the header is determined by a number of C-DAIs in a range of C-DAIs.

Example X23 includes the one or more computer-readable media of any of examples X17-X22 or some other example herein, wherein the HARQ-ACK feedback information is associated with a carrier frequency above 52.6 GHz. Example Z01 may include an apparatus comprising means to perform one or more elements of a method described in or related to any of examples 1-X23, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-X23, or any other method or process described herein.

Example Z03 may include an apparatus comprising logic, modules, or circuitry to perform one or more elements of a method described in or related to any of examples 1-X23, or any other method or process described herein.

Example Z04 may include a method, technique, or process as described in or related to any of examples 1-X23, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-X23, or portions thereof.

Example Z06 may include a signal as described in or related to any of examples 1-X23, or portions or parts thereof.

Example Z07 may include a datagram, packet, frame, segment, protocol data unit (PDU), or message as described in or related to any of examples 1-X23, or portions or parts thereof, or otherwise described in the present disclosure.

Example Z08 may include a signal encoded with data as described in or related to any of examples 1-X23, or portions or parts thereof, or otherwise described in the present disclosure.

Example Z09 may include a signal encoded with a datagram, packet, frame, segment, protocol data unit (PDU), or message as described in or related to any of examples 1-X23, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-X23, or portions thereof.

Example Z11 may include a computer program comprising instructions, wherein execution of the program by a processing element is to cause the processing element to carry out the method, techniques, or process as described in or related to any of examples 1-X23, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019-06). For the purposes of the present document, the following abbreviations may apply to the examples and embodiments discussed herein.

| | |
|---|---|
| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell- specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |

-continued

| | |
|---|---|
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |

-continued

| | |
|---|---|
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |

-continued

| | |
|---|---|
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTCmassive | MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |

-continued

| | |
|---|---|
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |

-continued

| | |
|---|---|
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time Rx Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |

-continued

| | |
|---|---|
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | SS/PBCH Block Resource Indicator, Synchronization |
| Block SSBRI | Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |

-continued

| | |
|---|---|
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

What is claimed is:

1. An apparatus comprising:

memory to store downlink control information (DCI) associated with a scheduled downlink (DL) transmission to be received by a user equipment (UE); and processor circuitry, coupled with the memory, to:

determine, based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission, wherein the HARQ-ACK feedback information includes a header of a HARQ-ACK codebook, wherein a size of the header is determined by a total downlink assignment index (T-DAI), and wherein bits for a first transmission reception point (TRP) are mapped from a beginning of the header and bits for a second TRP are mapped from an end of the header; and encode a message for transmission to a next-generation NodeB (gNB) that includes the HARQ-ACK feedback information.

2. The apparatus of claim 1, wherein a header of a HARQ-ACK codebook is to indicate whether each respective DCI from a plurality of DCIs is detected or not.

3. The apparatus of claim 1, wherein the time domain bundling size is based on an uplink control information (UCI) payload size and the HARQ-ACK codebook size.

4. The apparatus of claim 3, wherein separate time domain bundling sizes are applied to HARQ-ACK feedback information for PDSCH scheduled by fallback DCI and to HARQ-ACK feedback information for PDSCH scheduled by non-fallback DCI.

5. The apparatus of claim 1, wherein the HARQ-ACK feedback information is for PDSCH transmissions transmitted by two transmission reception points (TRPs).

6. The apparatus of claim 5, wherein the HARQ-ACK feedback information includes an indication of a counter downlink assignment index (C-DAI) that is to count a number of physical downlink control channel (PDCCH) transmissions scheduling PDSCH transmissions on the two TRPs, wherein: the C-DAI resets to a value of 1 when a new HARQ-ACK codebook is to be generated, or the C-DAI does not reset.

7. The apparatus of claim 6, wherein the HARQ-ACK feedback information includes a header of a HARQ-ACK codebook, wherein a size of the header is determined by a number of C-DAIs in a range of C-DAIs.

8. The apparatus of claim 1, wherein the HARQ-ACK feedback information is associated with a carrier frequency above 52.6 GHz.

9. One or more non-transitory computer-readable media storing instructions that, when executed by one or more processors, cause a user equipment (UE) to:

receive, from a next-generation NodeB (gNB), downlink control information (DCI) associated with a scheduled downlink (DL) transmission to be received by the UE;

determine, based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission, wherein the HARQ-ACK feedback information includes a header of a HARQ-ACK codebook, wherein a size of the header is determined by a total downlink assignment index (T-DAI), and wherein bits for a first transmission reception point (TRP) are mapped from a beginning of the header and bits for a second TRP are mapped from an end of the header; and encode a message for transmission to a next-generation NodeB (gNB) that includes the HARQ-ACK feedback information.

10. The one or more non-transitory computer-readable media of claim 9, wherein a header of a HARQ-ACK codebook is to indicate whether each respective DCI from a plurality of DCIs is detected or not.

11. The one or more non-transitory computer-readable media of claim 9, wherein the time domain bundling size is based on an uplink control information (UCI) payload size and the HARQ-ACK codebook size.

12. The one or more non-transitory computer-readable media of claim 11, wherein separate time domain bundling sizes are applied to HARQ-ACK feedback information for PDSCH scheduled by fallback DCI and to HARQ-ACK feedback information for PDSCH scheduled by non-fallback DCI.

13. The one or more non-transitory computer-readable media of claim 9, wherein the HARQ-ACK feedback information includes HARQ-ACK feedback information for PDSCH transmissions transmitted by two transmission reception points (TRPs), and wherein the HARQ-ACK feedback information includes an indication of a counter downlink assignment index (C-DAI) that is to count a number of physical downlink control channel (PDCCH) transmissions scheduling PDSCH transmissions on the two TRPs, wherein: the C-DAI resets to a value of 1 when a new HARQ-ACK codebook is to be generated, or the C-DAI does not reset.

14. The one or more non-transitory computer-readable media of claim 13, wherein the HARQ-ACK feedback information includes a header of a HARQ-ACK codebook, wherein a size of the header is determined by a number of C-DAIs in a range of C-DAIs.

15. One or more non-transitory computer-readable media storing instructions that, when executed by one or more processors, cause a user equipment (UE) to:

receive, from a next-generation NodeB (gNB), downlink control information (DCI) associated with a scheduled downlink (DL) transmission to be received by the UE;

determine, based on the DCI, time-domain bundled hybrid automatic repeat request-acknowledgement (HARQ-ACK) feedback information that includes an indication of a HARQ-ACK codebook size for the DCI based on a time domain bundling size and a number of code block bundle (CBB) groups associated with a physical downlink shared channel (PDSCH) transmission, wherein the time domain bundling size is based on an uplink control information (UCI) payload size and the HARQ-ACK codebook size; and encode a message for transmission to a next-generation NodeB (gNB) that includes the HARQ-ACK feedback information.

16. The one or more non-transitory computer-readable media of claim 15, wherein a header of a HARQ-ACK codebook is to indicate whether each respective DCI from a plurality of DCIs is detected or not.

17. The one or more non-transitory computer-readable media of claim 15, wherein separate time domain bundling sizes are applied to HARQ-ACK feedback information for PDSCH scheduled by fallback DCI and to HARQ-ACK feedback information for PDSCH scheduled by non-fallback DCI.

18. The one or more non-transitory computer-readable media of claim 17, wherein the HARQ-ACK feedback information includes HARQ-ACK feedback information for PDSCH transmissions transmitted by two transmission reception points (TRPs), wherein the HARQ-ACK feedback information includes an indication of a counter downlink assignment index (C-DAI) that is to count a number of physical downlink control channel (PDCCH) transmissions scheduling PDSCH transmissions on the two TRPs, and wherein: the C-DAI resets to a value of 1 when a new HARQ-ACK codebook is to be generated, or the C-DAI does not reset.

19. The one or more non-transitory computer-readable media of claim 18, wherein the HARQ-ACK feedback information includes a header of a HARQ-ACK codebook, wherein a size of the header is determined by a number of C-DAIs in a range of C-DAIs.

20. The one or more non-transitory computer-readable media of claim 15, wherein the HARQ-ACK feedback information is associated with a carrier frequency above 52.6 GHz.

* * * * *